US011569859B2

(12) United States Patent
Miller

(10) Patent No.: US 11,569,859 B2
(45) Date of Patent: Jan. 31, 2023

(54) FURNITURE HAVING LOAD-BEARING OR NON-LOAD BEARING STRUCTURES FOR STORAGE OF WATER OR OTHER MATERIAL

(71) Applicant: Tonia Walstad Miller, Excelsior, MN (US)

(72) Inventor: Tonia Walstad Miller, Excelsior, MN (US)

( * ) Notice: Subject to any disclaimer, the term of this patent is extended or adjusted under 35 U.S.C. 154(b) by 0 days.

(21) Appl. No.: 17/693,732

(22) Filed: Mar. 14, 2022

(65) Prior Publication Data

US 2022/0200647 A1 Jun. 23, 2022

Related U.S. Application Data

(63) Continuation of application No. 13/218,874, filed on Aug. 26, 2011.

(51) Int. Cl.
| | | |
|---|---|---|
| *A47C 13/00* | (2006.01) | |
| *A47C 15/00* | (2006.01) | |
| *A47C 7/00* | (2006.01) | |
| *A47C 7/62* | (2006.01) | |
| *A47B 13/00* | (2006.01) | |
| *A47C 5/00* | (2006.01) | |
| *H04B 1/38* | (2015.01) | |

(52) U.S. Cl.
CPC ............. *H04B 1/38* (2013.01); *A47B 13/003* (2013.01); *A47C 5/00* (2013.01); *A47C 7/006* (2013.01); *A47C 7/62* (2013.01); *A47C 7/626* (2018.08); *A47C 13/00* (2013.01); *A47C 15/00* (2013.01)

(58) Field of Classification Search
CPC ......... H04B 1/38; A47B 13/003; A47C 7/626; A47C 5/00; A47C 7/006; A47C 13/00; A47C 15/00
USPC .................... 297/188.08, 188.09, 188.1, 248
See application file for complete search history.

(56) References Cited

U.S. PATENT DOCUMENTS

| | | | |
|---|---|---|---|
| 3,810,265 | A | 5/1974 | McGrew |
| 3,815,165 | A | 6/1974 | Tobinick et al. |
| 3,867,731 | A | 2/1975 | Isaac |
| 4,073,241 | A | 2/1978 | Wheeler |

(Continued)

FOREIGN PATENT DOCUMENTS

| | | |
|---|---|---|
| CN | 27965126 Y | 4/2005 |
| CN | 2796516 Y | 7/2006 |

(Continued)

OTHER PUBLICATIONS

The International Search Report and the Written Opinion of the International Searching Authority dated Sep. 24, 2012 for International Application No. PCT/US2012/050064 filed on Aug. 9, 2012 by Tonia Walstad Miller, 12 pages.

(Continued)

*Primary Examiner* — Anthony D Barfield
(74) *Attorney, Agent, or Firm* — Cesari and McKenna, LLP; Michael E. Attaya

(57) ABSTRACT

Furniture pieces which incorporate load-bearing or non-load bearing structures in which water or other material may be stored. By incorporating such storage capacity within furniture, a user may take advantage of space that would otherwise be unused or unusable to unobtrusively and conveniently store an emergency water supply or other desired material.

1 Claim, 26 Drawing Sheets

(56) References Cited

U.S. PATENT DOCUMENTS

| | | | |
|---|---|---|---|
| 4,189,181 A | 2/1980 | Noble et al. | |
| 4,308,955 A | 1/1982 | Schieser et al. | |
| 4,458,864 A | 7/1984 | Colombo et al. | |
| 4,671,412 A | 6/1987 | Gatten | |
| 4,718,452 A | 1/1988 | Maitland | |
| 4,738,486 A | 4/1988 | Surber | |
| 4,793,013 A | 12/1988 | Barbulla | |
| 4,838,613 A | 6/1989 | Smith | |
| 5,002,199 A | 3/1991 | Frahm | |
| 5,046,529 A | 9/1991 | Corella | |
| 5,060,580 A | 10/1991 | Shaw | |
| 5,133,469 A | 7/1992 | Mehta et al. | |
| D345,870 S | 4/1994 | Williams | |
| 5,327,838 A | 7/1994 | Beltman | |
| D353,436 S | 12/1994 | Hess | |
| 5,485,920 A | 1/1996 | Fritz | |
| 5,622,404 A * | 4/1997 | Menne | A47C 4/52 |
| | | | 297/188.1 |
| 5,743,438 A | 4/1998 | Sokolnicki | |
| 5,778,471 A | 7/1998 | Collison | |
| 5,839,788 A | 11/1998 | Orr, III | |
| 5,860,705 A | 1/1999 | Ridder | |
| 6,024,407 A | 2/2000 | Eakin | |
| 6,050,638 A * | 4/2000 | West, III | A47C 7/628 |
| | | | 297/188.09 |
| 6,267,446 B1 * | 7/2001 | Wieland | A47C 7/546 |
| | | | 297/188.08 |
| 6,327,997 B1 | 12/2001 | Terry et al. | |
| 6,511,027 B1 | 1/2003 | Yu | |
| 6,553,723 B1 | 4/2003 | Alcorn | |
| 6,729,490 B2 | 5/2004 | Bylo | |
| 6,851,563 B1 | 2/2005 | Lipari | |
| 7,069,609 B2 | 7/2006 | Zheng | |
| 7,901,000 B1 | 3/2011 | Sorensen et al. | |
| 8,132,856 B2 * | 3/2012 | Wilson | A47C 17/86 |
| | | | 297/188.09 |
| 8,584,917 B2 | 11/2013 | Hexels | |
| 2002/0077225 A1 | 6/2002 | Selsam | |
| 2003/0042827 A1 | 3/2003 | Strube | |
| 2003/0173328 A1 | 9/2003 | Herckner | |
| 2006/0000740 A1 | 1/2006 | Sigur | |
| 2006/0037924 A1 | 2/2006 | Palmisano | |
| 2006/0054768 A1 | 3/2006 | Sanchez | |
| 2006/0061154 A1 | 3/2006 | Kahan | |
| 2006/0096942 A1 | 5/2006 | Lane | |
| 2006/0180614 A1 | 8/2006 | Barron | |
| 2006/0255000 A1 | 11/2006 | Quintana | |
| 2006/0261654 A1 * | 11/2006 | Stallman | A47C 15/004 |
| | | | 297/310 |
| 2007/0114200 A1 | 5/2007 | Lane | |
| 2007/0199840 A1 | 8/2007 | Woods et al. | |
| 2008/0179935 A1 | 7/2008 | Blossom | |
| 2008/0211360 A1 | 9/2008 | Eubanks | |
| 2008/0237101 A1 | 10/2008 | Roussel et al. | |
| 2009/0183638 A1 | 7/2009 | Ganti | |
| 2009/0255893 A1 | 10/2009 | Zummo et al. | |
| 2009/0266782 A1 | 10/2009 | Lane | |
| 2010/0038938 A1 | 2/2010 | Feinstein | |
| 2010/0206761 A1 | 8/2010 | Bubat et al. | |
| 2010/0284747 A1 | 11/2010 | Peterson et al. | |
| 2011/0005602 A1 | 1/2011 | Harrington | |
| 2012/0204765 A1 | 8/2012 | Khanjian et al. | |

FOREIGN PATENT DOCUMENTS

| | | | |
|---|---|---|---|
| CN | 201480654 U | 6/2009 | |
| CN | 201480654 U | 8/2009 | |
| CN | 201709806 U | 7/2010 | |
| CN | 201879203 U | 6/2011 | |
| DE | 10 2010 021548 A1 | 11/2010 | |
| FR | 2 782 620 A1 | 3/2000 | |
| JP | S62183784 | 11/1987 | |
| JP | 08338371 | 12/1996 | |
| JP | 11346875 | 12/1999 | |
| JP | 2002101952 A | 10/2000 | |
| JP | 2002101952 | 4/2002 | |
| JP | 2007195909 | 8/2007 | |
| JP | 3152193 U | 7/2009 | |
| JP | 2010167227 | 8/2010 | |
| KR | 200314932 | 6/2003 | |
| WO | WO 03/086150 A2 | 10/2003 | |
| WO | WO 2008/015668 | 2/2008 | |

OTHER PUBLICATIONS

Emergency Water Store Duxford Airfield, http://www.americanairmuseum.com/media/2808, Roger Freeman Collection FRE 5627, American Air Museum in Britain, printed Jul. 23, 2018.

MacMillan Dictionary, Definition of Food, https://www.macmillandictionary.com/us/dictionary/american/food, printed Jul. 9, 2018.

MacMillan Dictionary, Definition of Foodstuff, https://www.macmillandictionary.com/us/dictionary/american/foodstuff, printed Jul. 9, 2018.

Merriam-Webster Dictionary, Definition of Food, https://www.merriam-webster.com/dictionary/food, printed Jul. 9, 2018.

Merriam-Webster Dictionary, Definiton of Foodstuff, https://www.merriam-webster.com/dictionary/foodstuff, printed Jul. 9, 2018.

\* cited by examiner

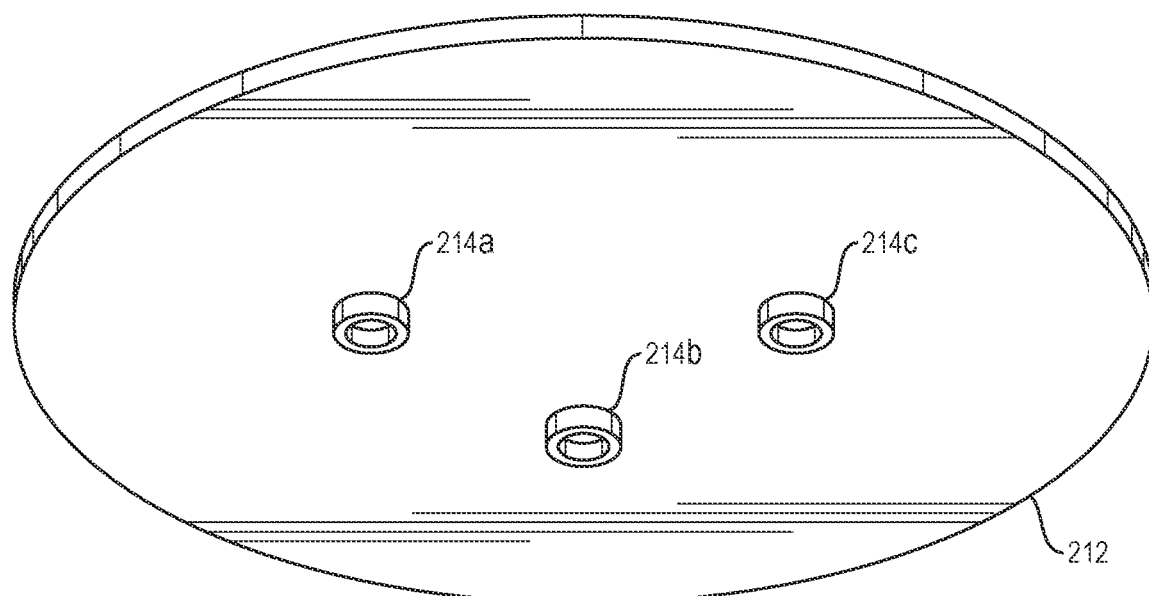
FIG. 2C
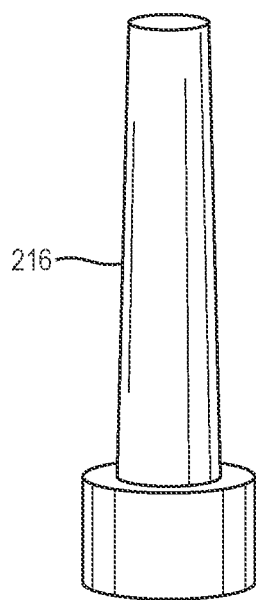 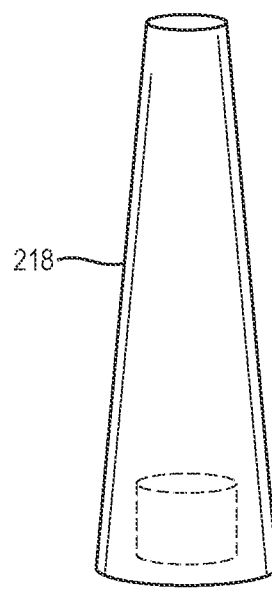 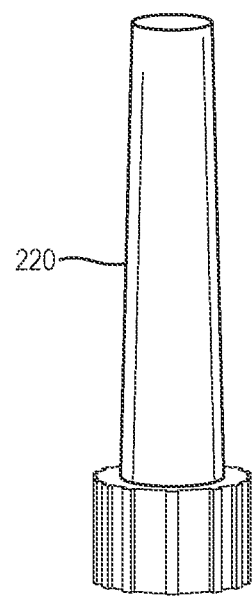
FIG. 2D  FIG. 2E  FIG. 2F

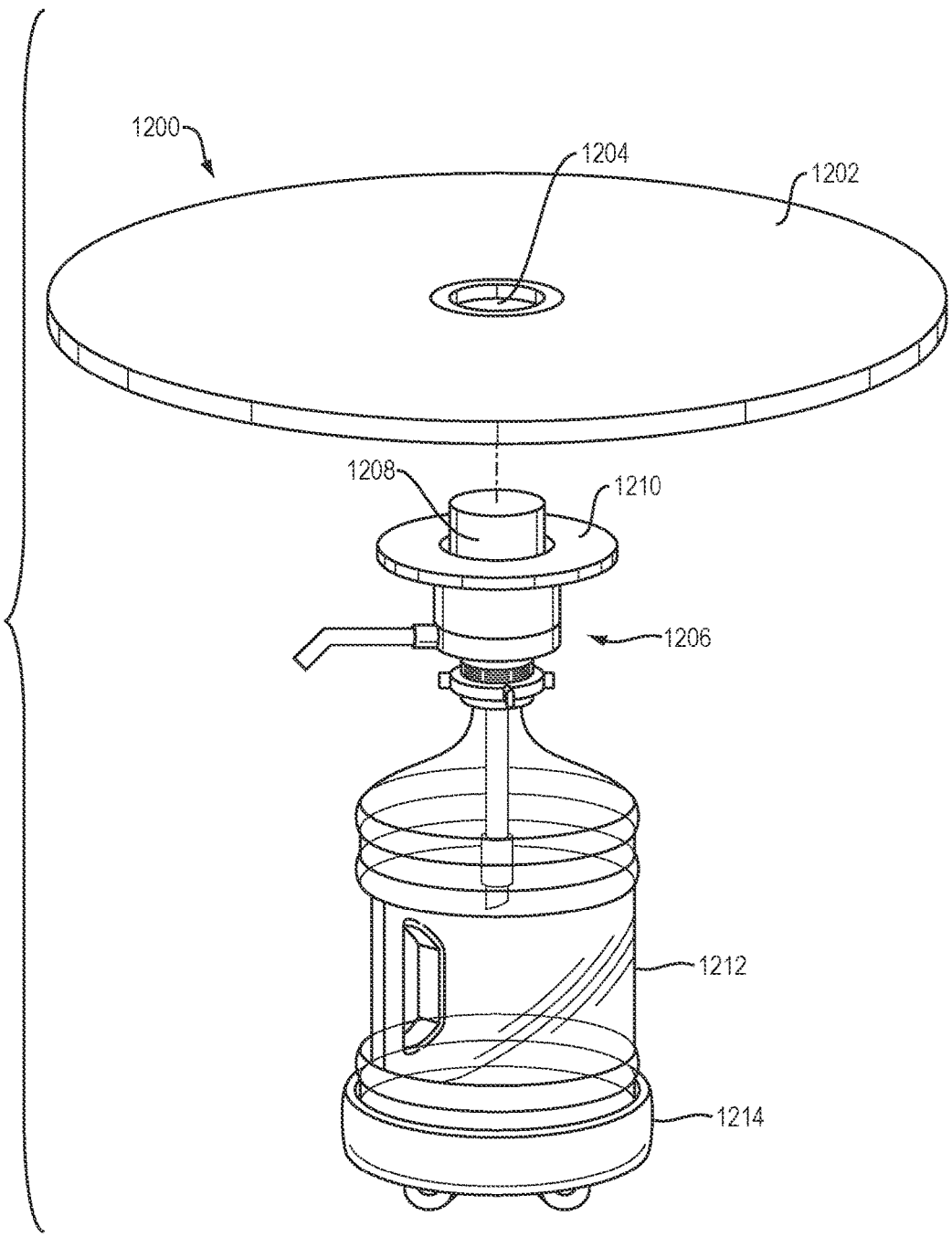

FURNITURE HAVING LOAD-BEARING OR NON-LOAD BEARING STRUCTURES FOR STORAGE OF WATER OR OTHER MATERIAL

CROSS-REFERENCE TO RELATED APPLICATIONS

The present application is a continuation of commonly assigned copending U.S. patent application Ser. No. 13/218,874, which was filed on Aug. 26, 2011, by Tonia Walstad Miller for FURNITURE HAVING LOAD-BEARING OR NON-LOAD BEARING STRUCTURES FOR STORAGE OF WATER OR OTHER MATERIAL, which is hereby incorporated by reference.

BACKGROUND OF THE INVENTION

Field of the Invention

The present invention relates generally to furniture and, more specifically, to furniture which incorporates load-bearing or non-load bearing structures in which water or other material may be stored.

Background Information

In preparation for possible emergency situations such as natural disasters, power outages and the like, public safety agencies often recommend that residents keep a supply of potable water stored in a readily accessible location. In an emergency in which a loss of power or contamination renders the normal water supply (municipal or private) unusable, residents who have made such preparations will have sufficient drinking water to sustain them for at least a brief time.

One problem that often arises in connection with creating an emergency water supply of sufficient capacity is inadequate storage space. For example, FEMA recommends storing at least a three-day emergency water supply which includes at least one gallon of water per person per day just for drinking. Following that recommendation with some additional allowance for unforeseen needs, a family of four persons would need to store at least 15 gallons of water. Further, the same family of four would need to store on the order of 35 gallons of water (e.g., 7 five-gallon containers) to be prepared for an emergency lasting about one week. Thus, storage of a reasonable emergency water supply for even a few people quickly translates into significant storage space. In addition, while it is desirable to store an emergency water supply such that is readily accessible, most people will also want to avoid moving heavy containers of water frequently or at all. Also, in order to avoid detracting from the atmosphere and décor of their homes, most people will prefer that their emergency water supplies be stored in a way that is inconspicuous and aesthetically acceptable.

SUMMARY OF THE INVENTION

In brief summary, the present invention provides a variety of furniture pieces which incorporate load-bearing or non-load bearing structures in which water or other material may be stored. By integrating such storage capacity within furniture, a user may take advantage of space that would otherwise be unused or unusable to unobtrusively and conveniently store an emergency water supply or other desired material.

In some embodiments of the present invention, one or more reusable water storage containers are used as a load-bearing structure for a chair, table or other furniture piece. In other embodiments, one or more reusable water storage containers may be used as a non-load bearing structure in a furniture piece. In still other embodiments of the present invention, one or more reusable water storage containers having a particular shape and dimensions may be used as either a load-bearing or non-load bearing structure in a furniture piece.

In some further embodiments of the present invention, in order to draw water or other material, a user may gain access to the storage container by removing a table top or chair seat or taking other action. In other embodiments, a pump assembly may be integrated with the furniture piece such that a user is able to draw from the storage container even when the furniture piece is in a normal position.

BRIEF DESCRIPTION OF THE DRAWINGS

The invention description below refers to the accompanying drawings, of which:

FIG. 2C is a bottom view of an alternative embodiment of the tabletop shown in FIG. 2A;

FIGS. 2D-2F are elevation views of table height extenders which are compatible with the tabletop of FIG. 2C;

FIG. 12A is a partially exploded view of a table whose load-bearing base includes a storage container and pump assembly;

DETAILED DESCRIPTION OF ILLUSTRATIVE EMBODIMENTS

Figure 1A:
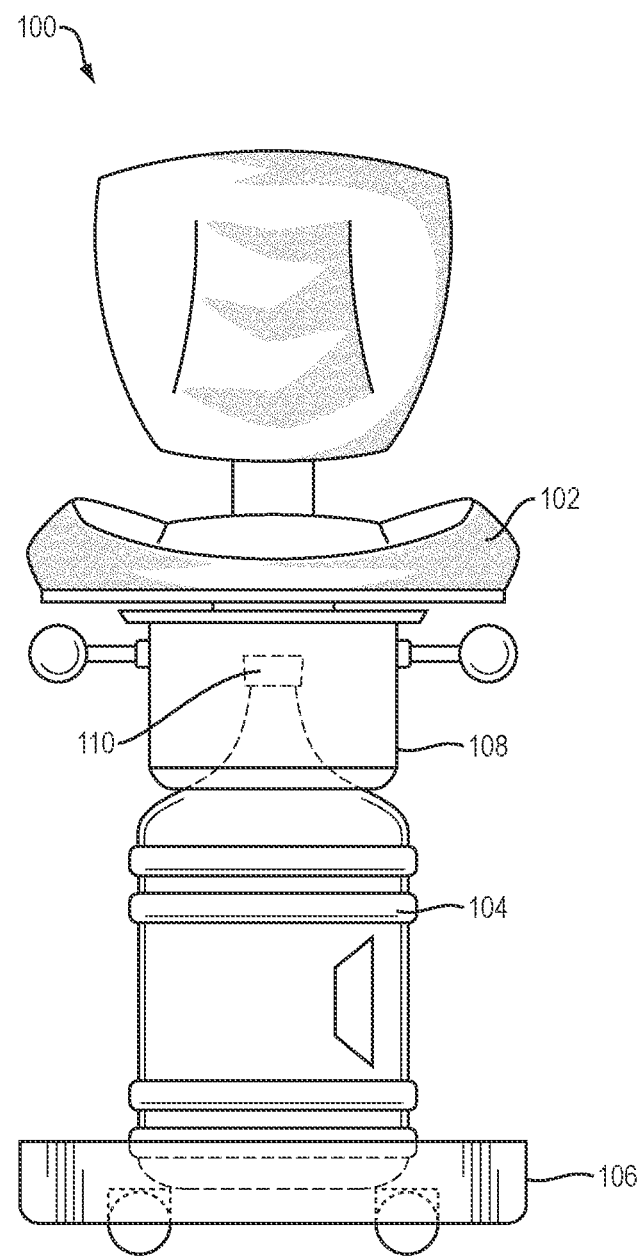
FIG. 1A is a front elevation view of a task chair whose load-bearing base includes a storage container which may be used to store an emergency water supply in accordance with a preferred embodiment of the present invention.
Figure 1B:
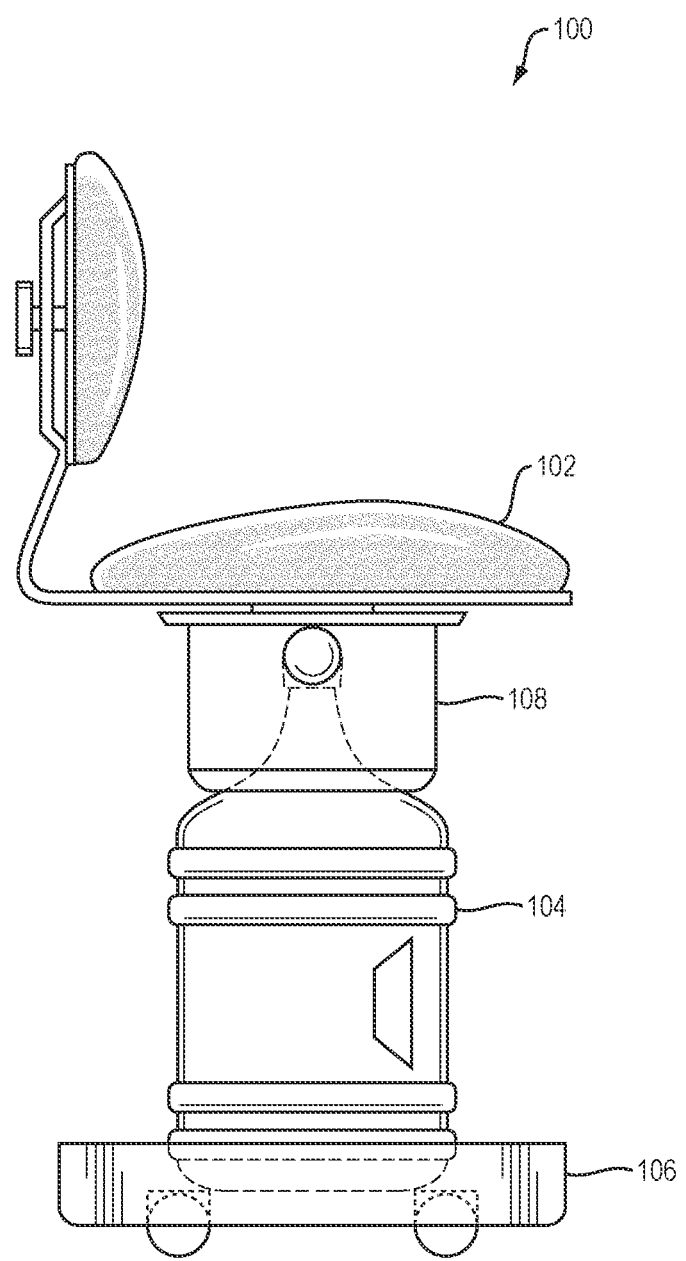
FIG. 1B is a side elevation view of the chair shown in FIG. 1A.
Figure 1C:
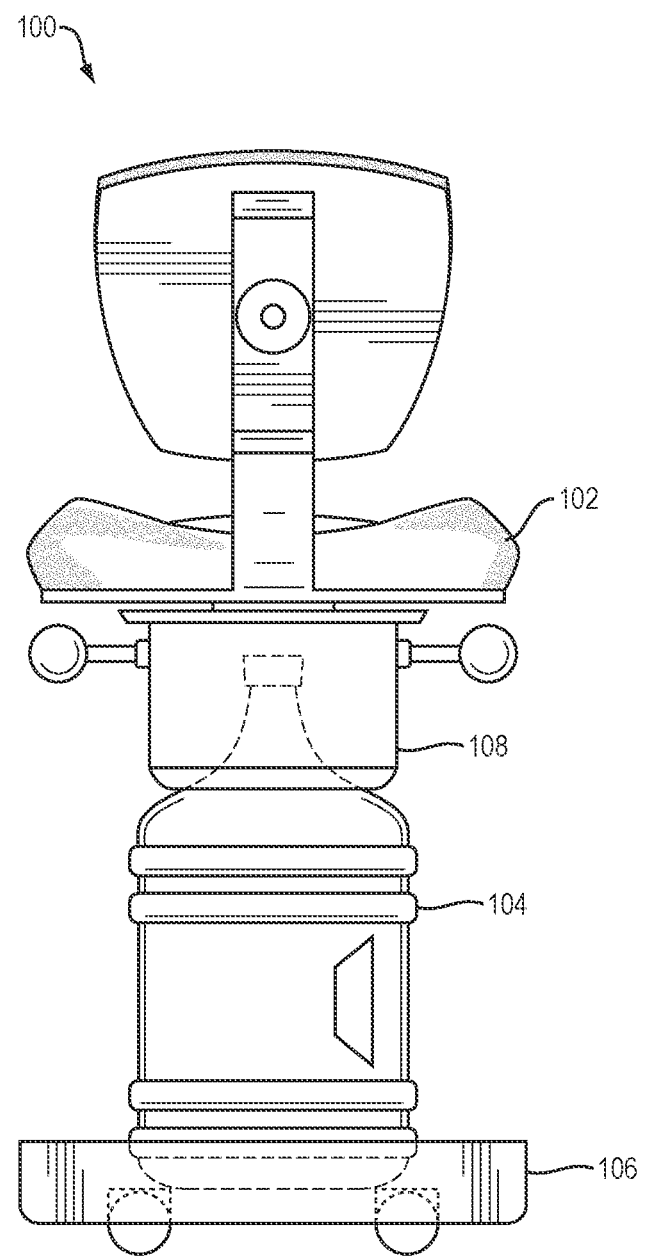
FIG. 1C is a rear elevation view of the chair shown in FIG. 1A.

With reference to FIGS. 1A-1C, a task chair 100 includes a seat and seatback assembly 102. An upper end of a support 108 is mechanically secured to a bottom surface of assembly 102. A lower end of support 108 is shaped and dimensioned to engage with and bear upon a storage container 104 while also keeping the bottom surface of assembly 102 clear of a spout 110. Storage container 104 is preferably a reusable, plastic container of appropriate capacity, dimensions and strength to both support normal loads (e.g., a seated person) expected for task chair 100 and provide appropriate height. Preferably, either assembly 102 is detachable from support 108 or support 108 is detachable from storage container 104 to allow a user ready access to spout 110. The bottom of storage container 104 is secured in an optional wheeled base 106 which permits task chair 100 to roll freely.

Storage container 104 functions as a load-bearing structure of task chair 100. In addition, storage container 104 may function as a store for water or other material. As a result, the space normally occupied by a conventional chair is advantageously converted into an emergency water store or other desired store while preserving the chair's original function.

Figure 2A:
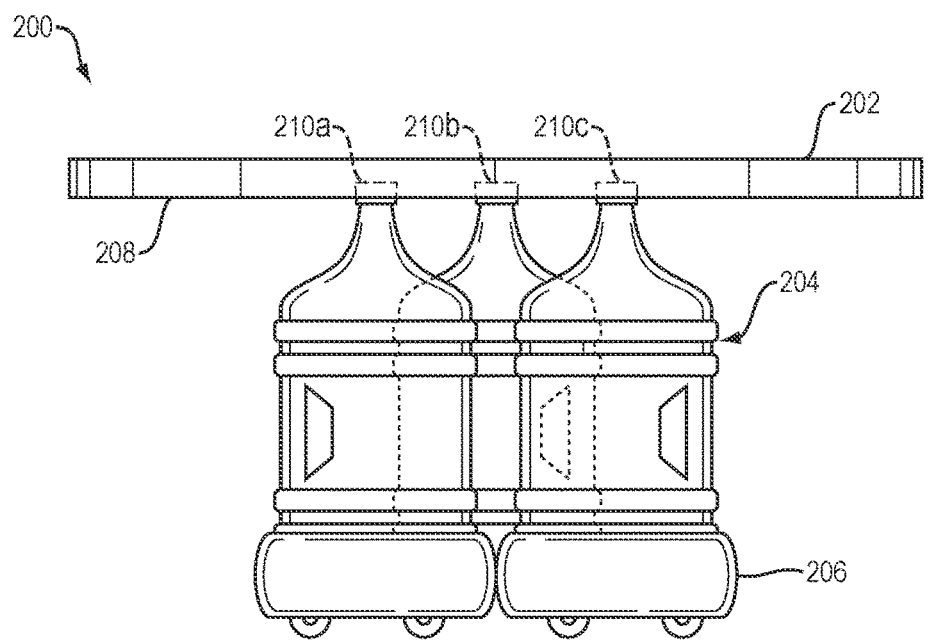
FIG. 2A is an elevation view of a round table whose load-bearing base includes three storage containers.
Figure 2B:
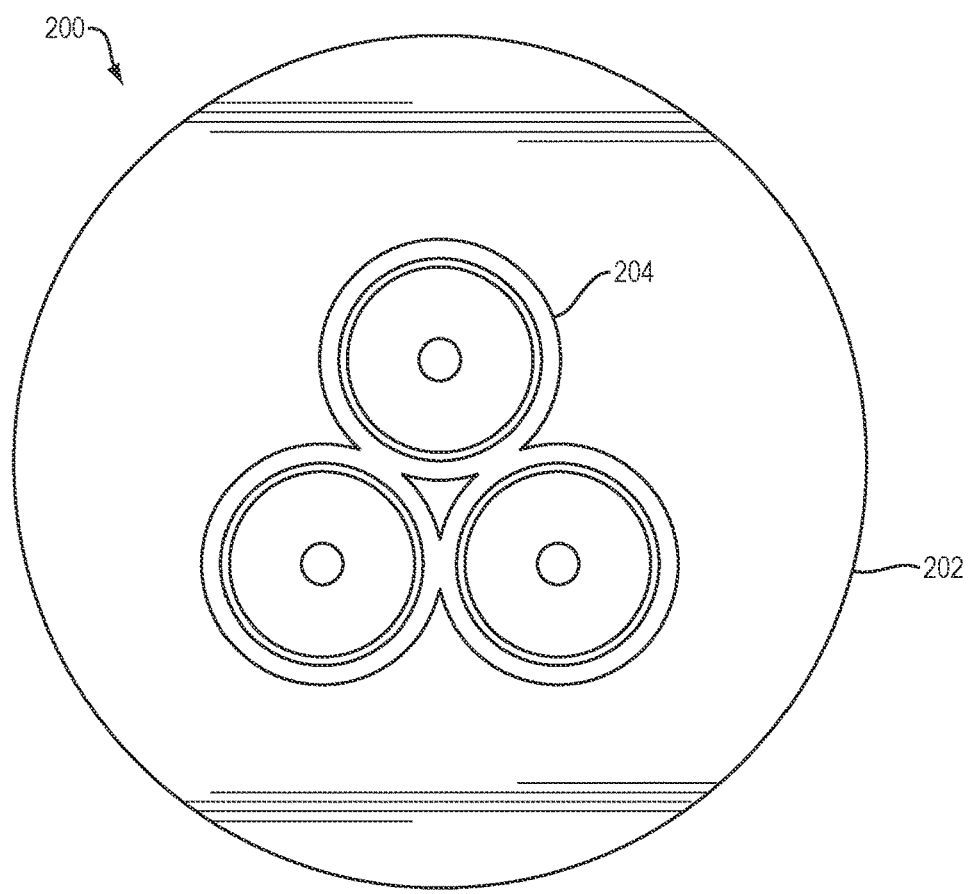
FIG. 2B is a top plan view of the table shown in FIG. 2A.

FIGS. 2A-2B show a table 200 having a round tabletop 202 which is supported by three storage containers 204 which together form a pedestal. Storage containers 204 together bear the load of tabletop 202 as well as any loads placed on the tabletop. A bottom surface 208 of tabletop 202 includes three recesses 210a, 210b and 210c which are located and dimensioned to accommodate the spouts of storage containers 204 respectively. Alternatively, tabletop 202 may be secured to storage containers 204 by a variety of conventional arrangements, such as brackets, clips or sockets, which preferably allow tabletop 202 to be removed in order to gain access to the spouts. Storage containers 204 are secured in an optional wheeled base 206.

As shown in FIG. 2C, as an alternative to placing recesses in the tabletop, a bottom surface of a tabletop 212 is fitted with three round receptacles 214a, 214b and 214c. Each of receptacles 214a-214c is shaped and dimensioned to receive an upper end of a table height extender 216, 218 and 220 shown in FIGS. 2D-2F. Each lower end of height extenders 216, 218 and 220 is adapted to mechanically engage a spout of a storage container 204. Height extenders 216, 218 and 220 may be implemented with a simple slide-on friction fitting, a threaded connection or other arrangement which is convenient and compatible with a particular spout design. Alternatively, other support structures which are adapted to mechanically engage storage containers 204 or the floor (or both) and capable of bearing the expected loads may be used. For example, scissor legs could be adapted to mechanically engage storage containers 204 while providing a convenient way to adjust the height of table 200.

Figure 3A:
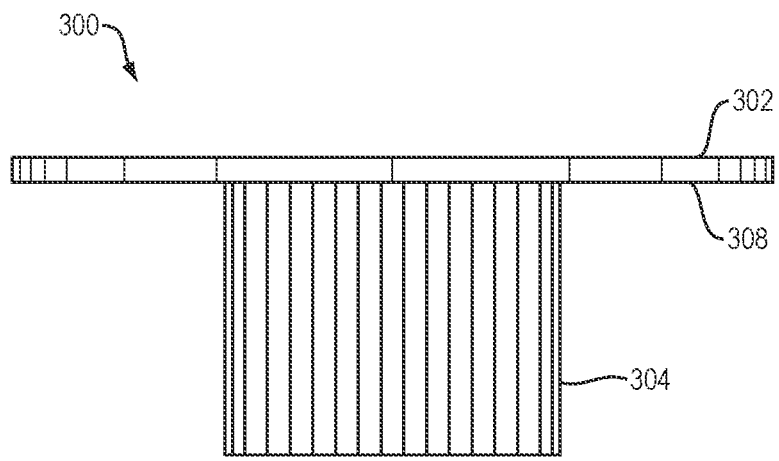
FIG. 3A is an elevation view of a square table whose load-bearing base includes four storage containers in a decorative enclosure.
Figure 3B:
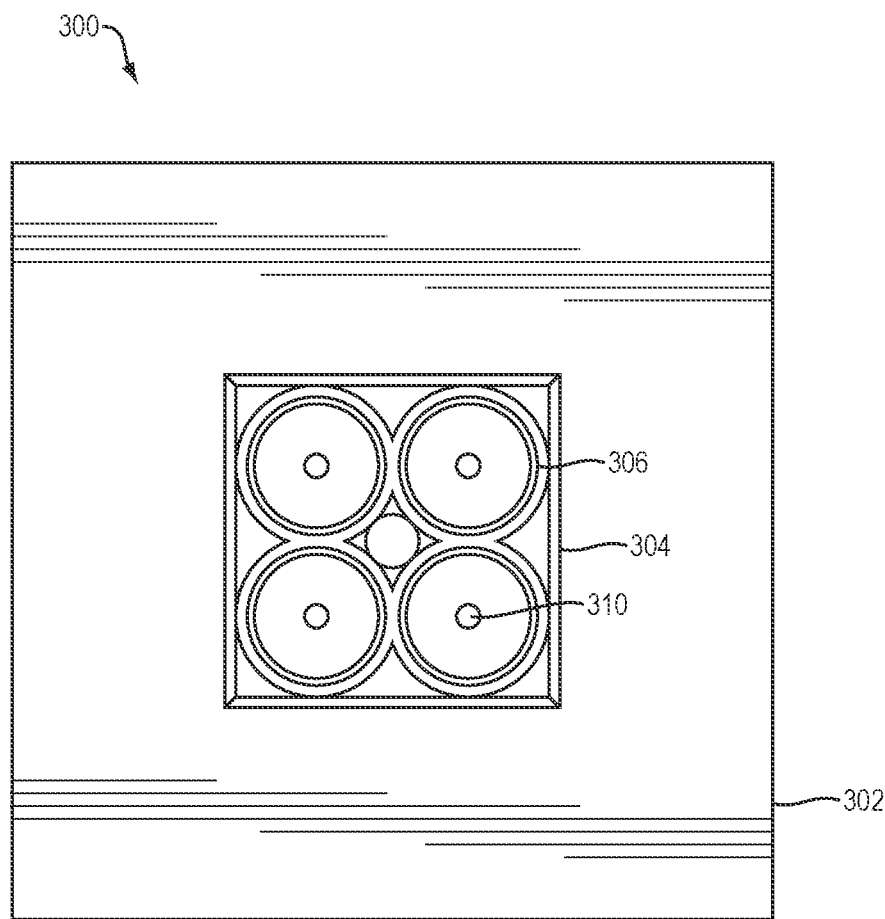
FIG. 3B is a top plan view of the table shown in FIG. 3A.

FIGS. 3A-3B show a table 300 having a square tabletop 302 which is supported by a square hollow pedestal 304. A bottom surface of tabletop 302 rests on a top edge of pedestal 304. Arranged within pedestal 304 are four storage containers 306. Access to spouts 310 of storage containers 306 may be gained by lifting tabletop 302 off of pedestal 304. Alternatively, pedestal 304 may include a side panel door (not shown) which provides access to storage containers 306 without removal of tabletop 302. Either pedestal 304 or storage containers 306 may be arranged to solely bear the load of tabletop 302 or, alternatively, the load may be shared. Similar arrangements may be made with respect to other embodiments described herein.

Figure 4A:
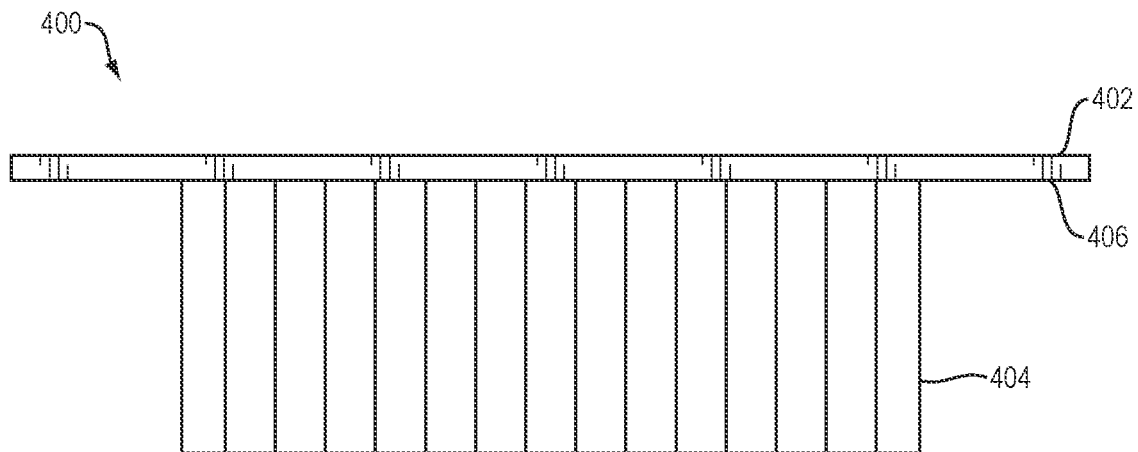
FIG. 4A is an elevation view of a rectangular table whose load-bearing base includes five storage containers in a decorative enclosure.
Figure 4B:
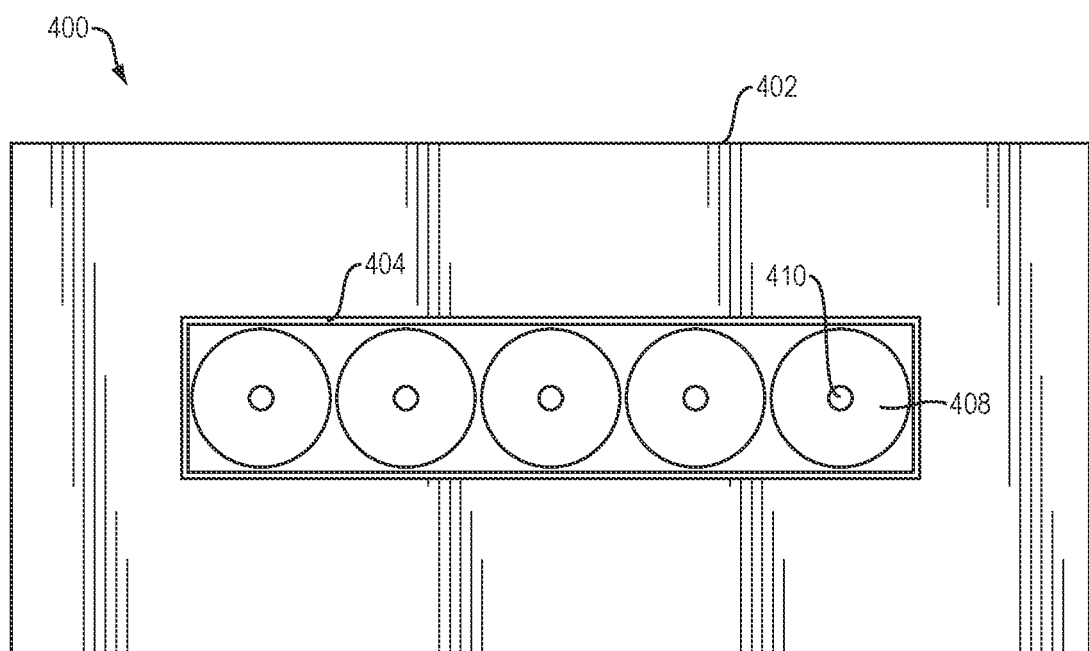
FIG. 4B is a top plan view of the table shown in FIG. 4A.

FIGS. 4A-4B show a table 400 having a rectangular tabletop 402 which is supported by a rectangular hollow pedestal 404. A bottom surface of tabletop 402 rests on a top edge of pedestal 404. Arranged within pedestal 404 are five storage containers 408. Access to spouts 410 of storage containers 408 may be gained by lifting tabletop 402 off of pedestal 404 or, alternatively, providing a side panel door (not shown) in pedestal 404.

Figure 5A:
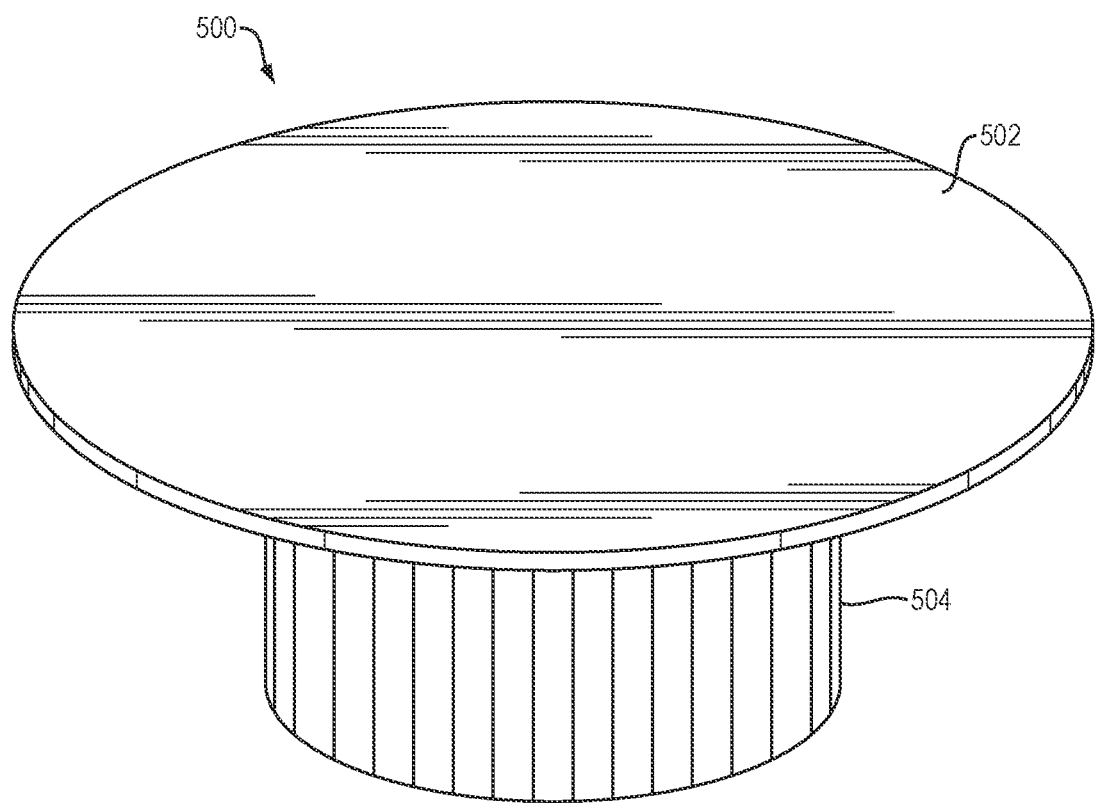
FIG. 5A is a perspective view of a round table having a hollow pedestal-type base.
Figure 5B:
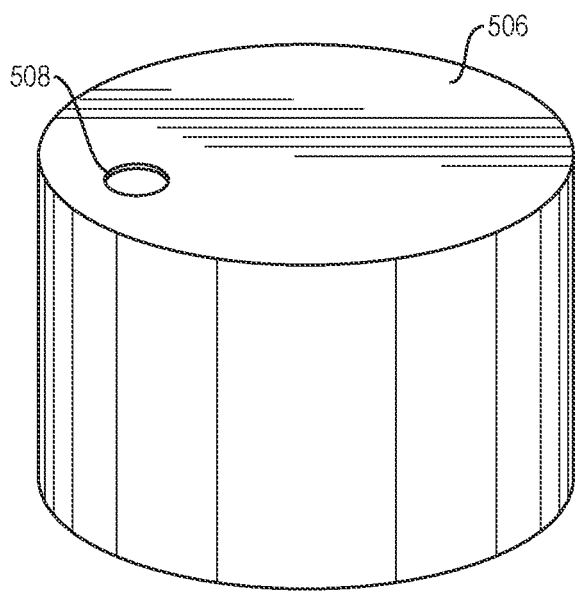
FIG. 5B is a perspective view of a storage container which may be housed within the hollow pedestal of the table shown in FIG. 5A.

FIG. 5A shows a table 500 having a round tabletop 502 which is supported by a round hollow pedestal 504. Pedestal 504 is shaped and dimensioned to accommodate a cylindrical storage container 506 which is shown in FIG. 5B. Storage container 506 includes a filling port 508 on its top surface. Thus, by removing tabletop 502, a user may gain access to either fill or draw from storage container 506. Storage container 506 may be either load-bearing or non-load bearing depending upon its height, the height of pedestal 504 and the material chosen for the container.

Figure 6A:
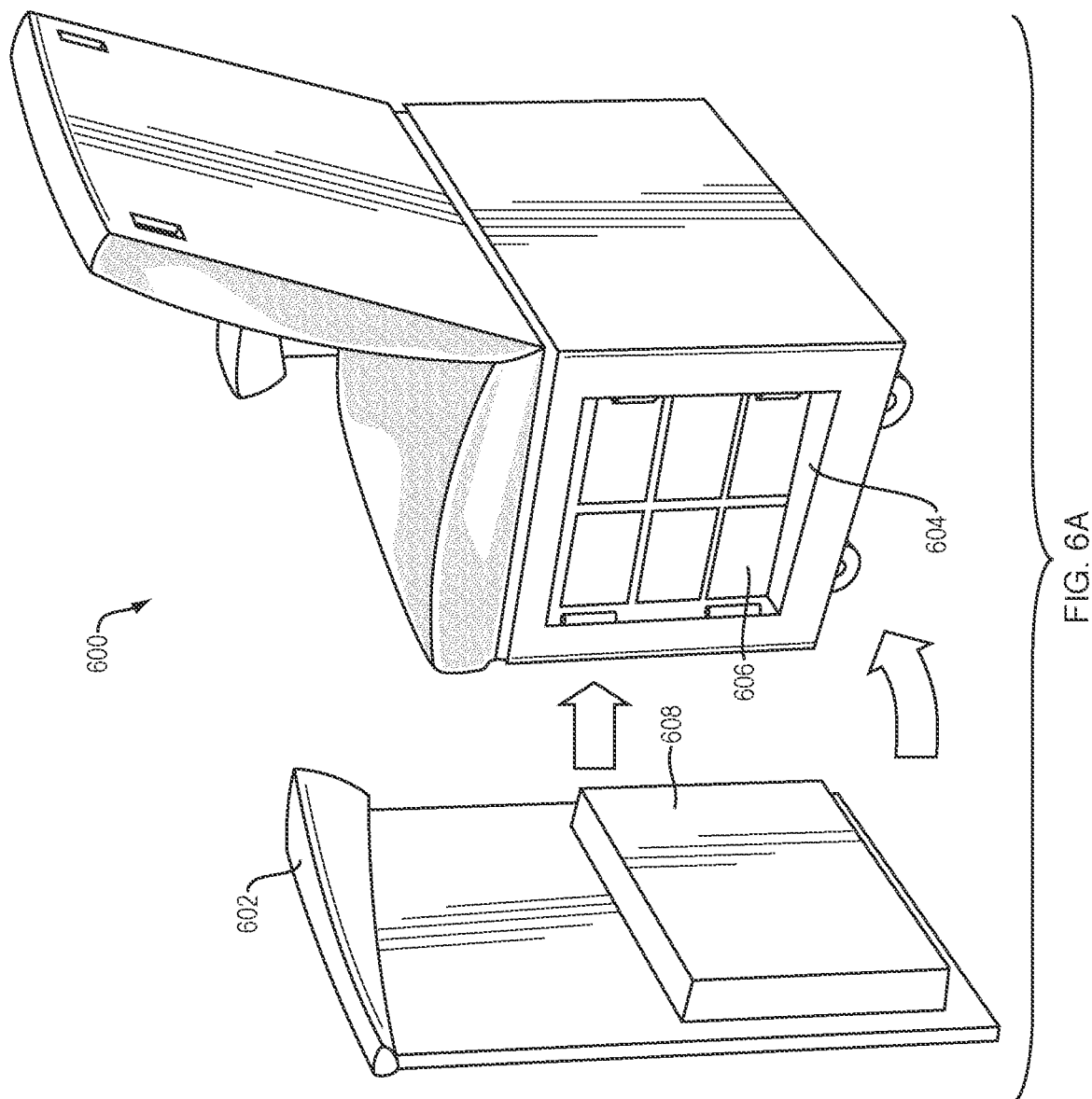
FIGS. 6A-6E are perspective views of armchairs whose bases house storage containers.

FIG. 6A shows an armchair 600 having at least one removable armrest 602 which provides access to a compartment 604. Compartment 604 houses one or more storage containers 606. Armrest 602 includes a panel 608 which is shaped and dimensioned to frictionally engage with compartment 604.

Figure 6B:
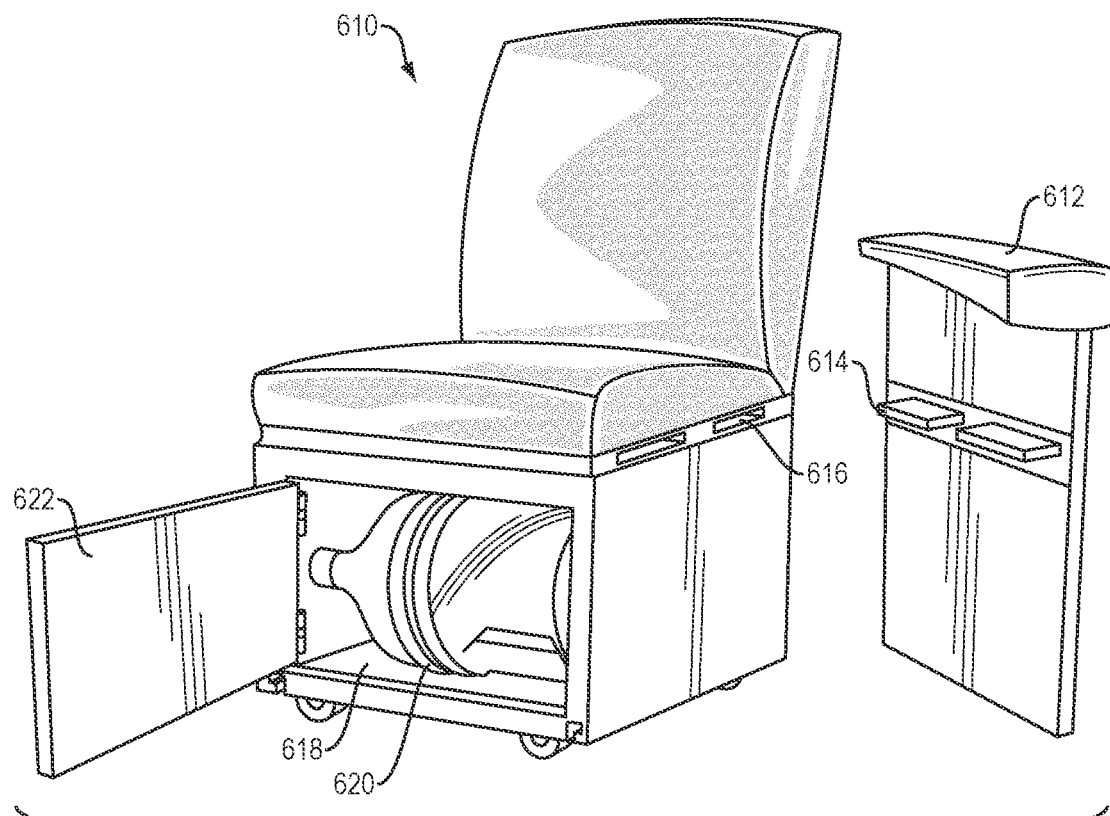

In an alternative embodiment shown in FIG. 6B, an armchair 610 has a removable armrest 612 which includes blocks 614. Blocks 614 are shaped and dimensioned to mate with slots 616 when armrest 612 is attached to armchair 610. A compartment 618 houses one or more storage containers 620 and may be accessed by a door 622.

Figure 6C:
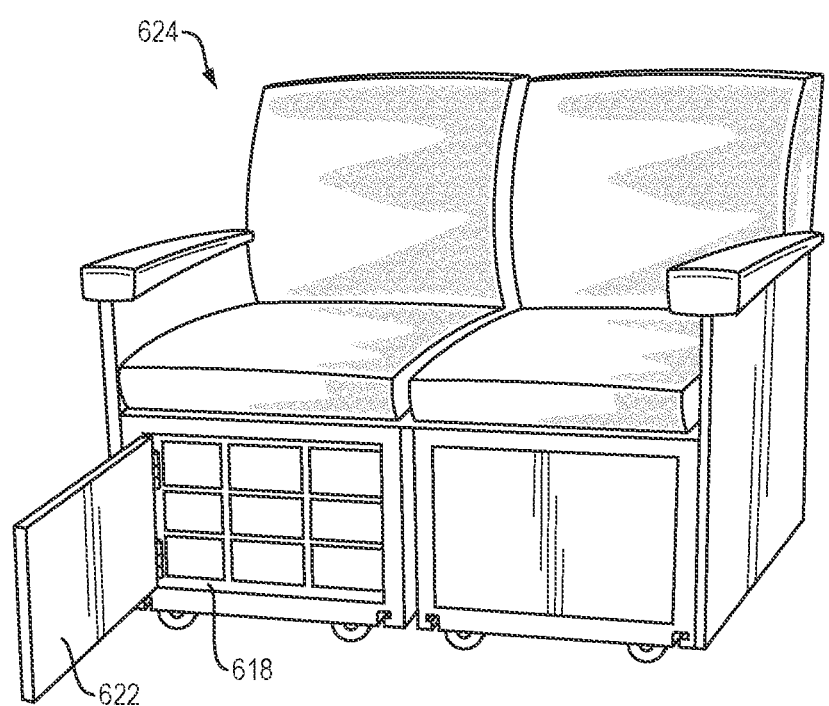
Figure 6D:
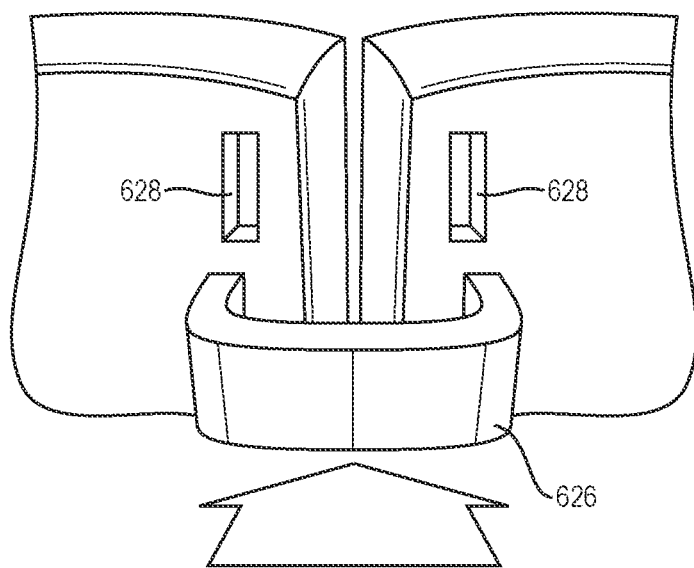
Figure 6E:
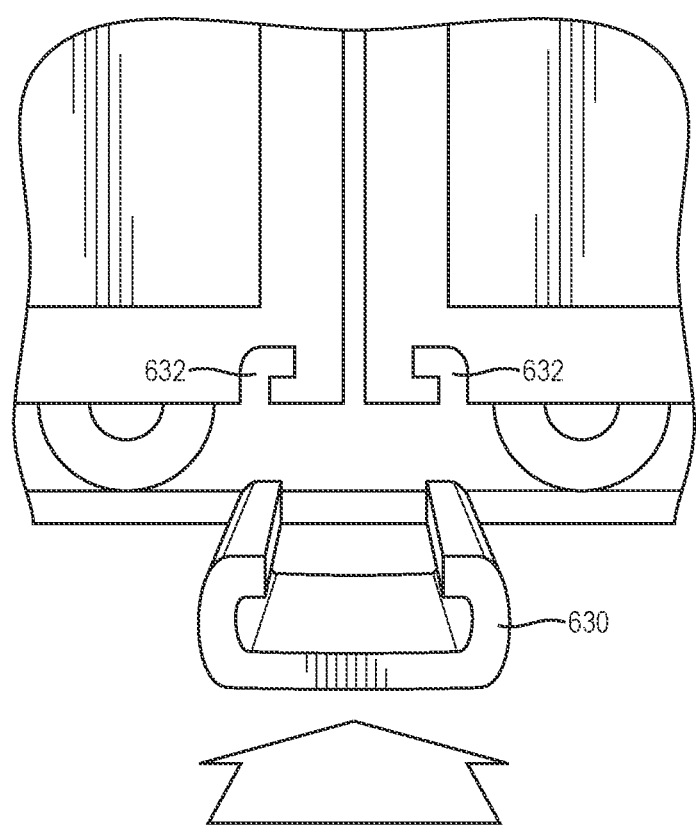

In another alternative embodiment shown in FIG. 6C, an armrest has been removed from each of two armchairs 610 which have been mechanically secured to form a bench or loveseat 624. Loveseat 624 is secured by a rear clip 626 (FIG. 6D) which is shaped and dimensioned to engage with slots 628 located on an upper back corner of each armchair 610. A front clip 630 (FIG. 6E) is similarly shaped and dimensioned to engage with slots 632 located on a lower front corner of each armchair 610.

Containers 606 and 620 may be either load-bearing or non-load bearing depending upon their dimensions and the material chosen for the containers.

Figure 7A:
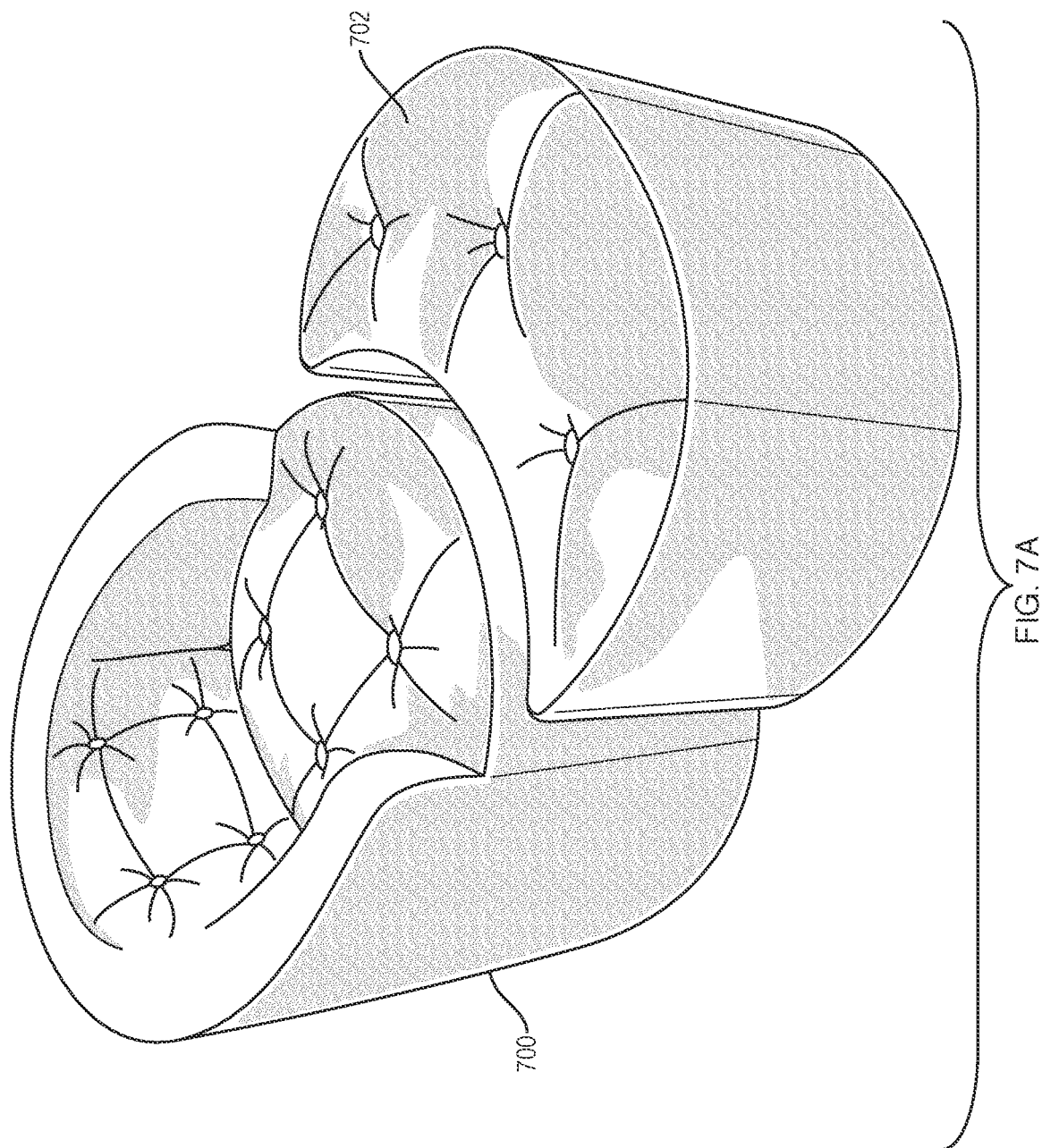
FIG. 7A is a perspective view of an upholstered chair and ottoman each of which may accommodate a storage container.
Figure 7B:
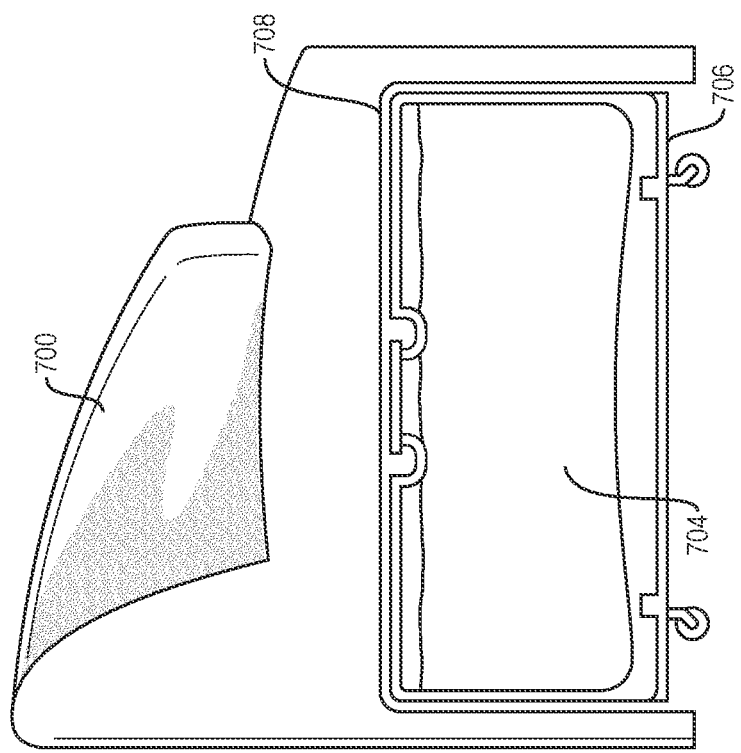
FIG. 7B is a cross-section of the chair shown in FIG. 7A showing a storage container which is housed beneath the seat of the chair.

FIG. 7A shows an upholstered chair 700 and ottoman 702. As shown in FIG. 7B, a storage container 704 having an optional wheeled base 706 is shaped and dimensioned to fit within a cavity 708 beneath chair 700. Storage container 704 may be either load-bearing or non-load bearing depending upon its height, the height of cavity 708 and the material chosen for the container. Access to storage container 704 may be gained by turning chair 700 on its side or, alternatively, lifting chair 700 off of the storage container. Alternatively, or in addition, another storage container (not shown) of appropriate shape and dimensions could be disposed in a cavity beneath ottoman 702. In both cases, storage container 704 provides water storage in a convenient and unobtrusive way that does not detract from a user's décor.

Figure 8A:
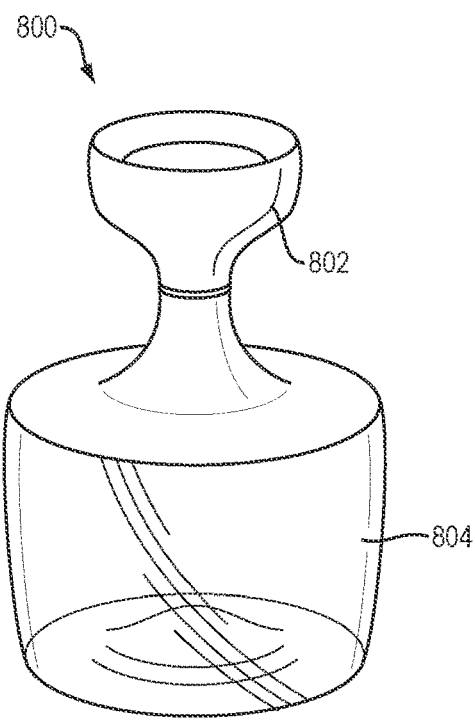
FIG. 8A is a perspective view of a load-bearing storage container for storing water or other material which may be adapted for use with a variety of furniture types.
Figure 8D:
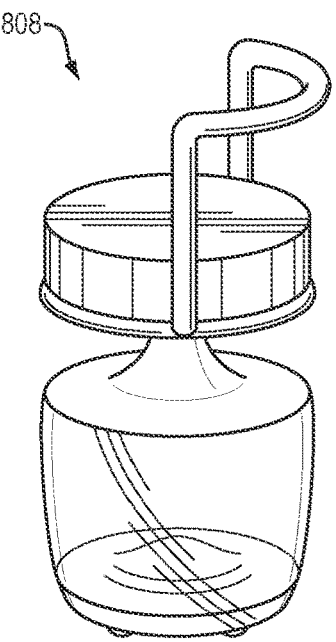
FIGS. 8B-8H are perspective views of a variety of chairs and tables that incorporate the storage container shown in FIG. 8A.
Figure 8B:
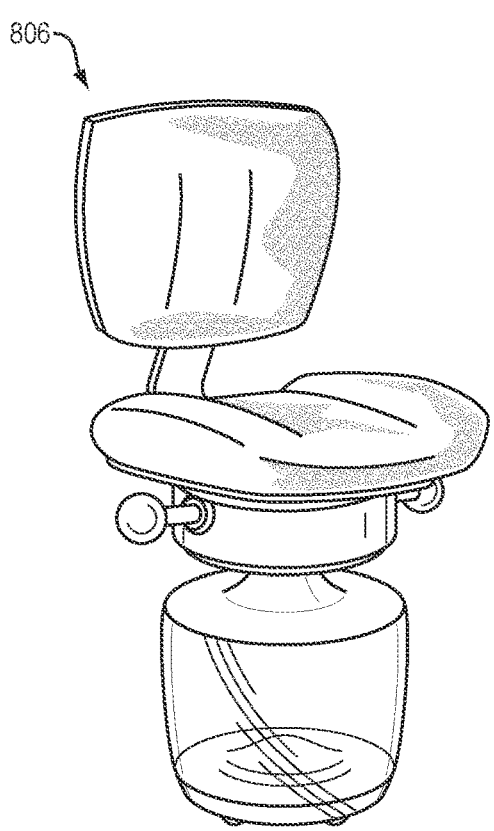
Figure 8E:
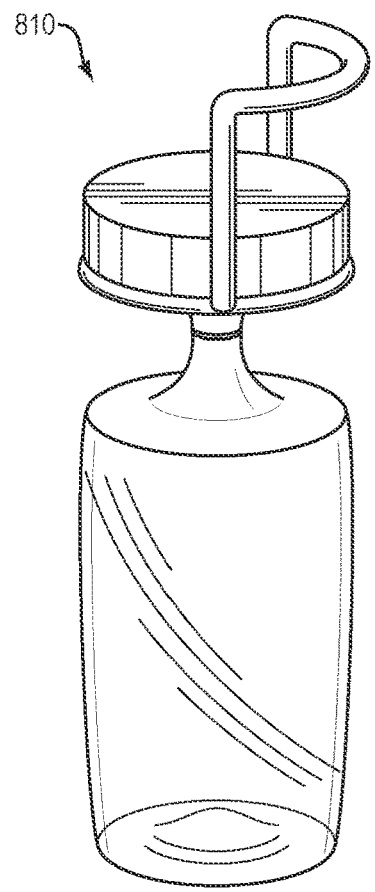
Figure 8C:
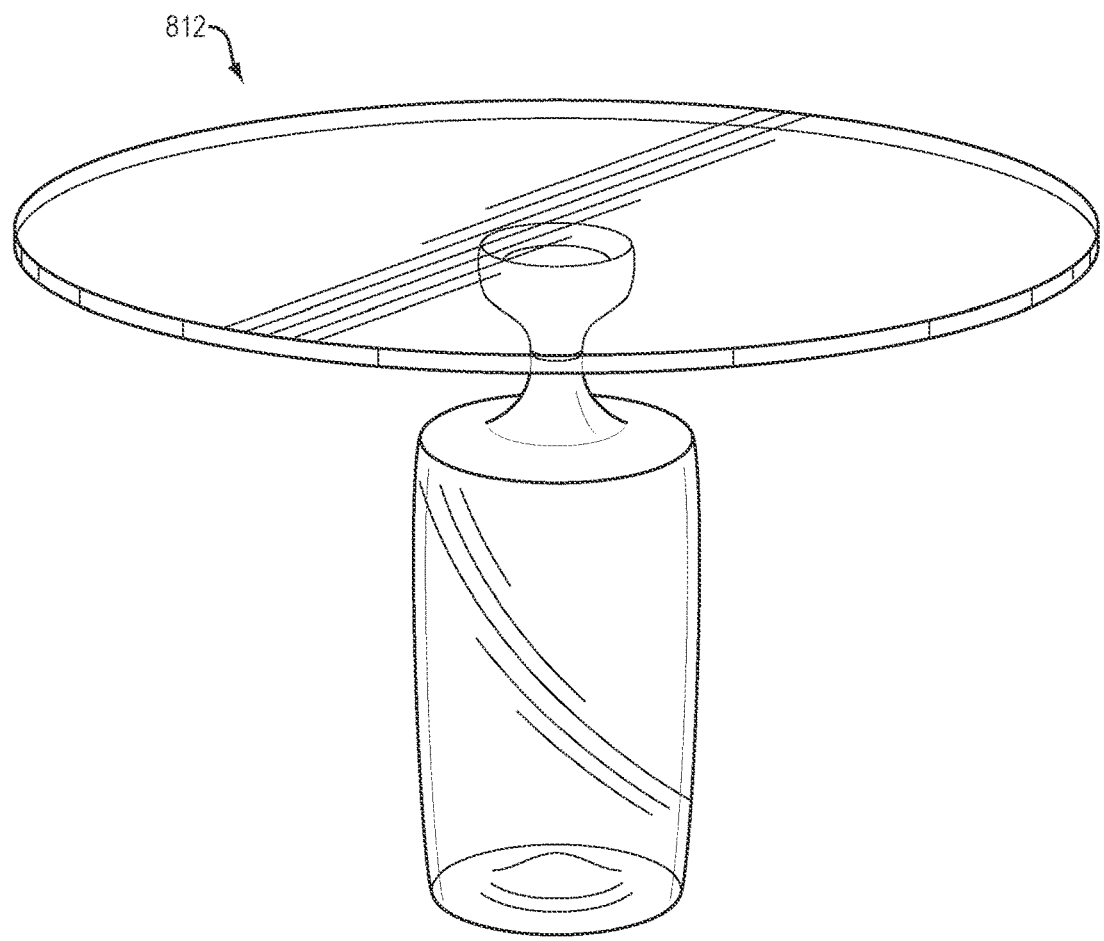
Figure 8F:
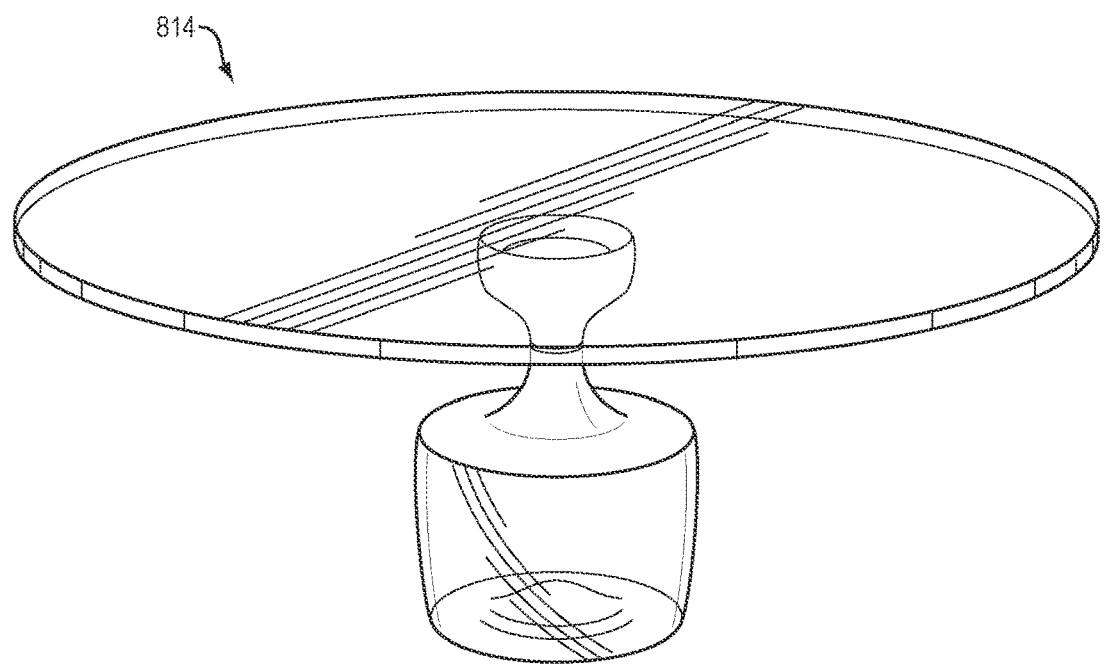
Figure 8G:
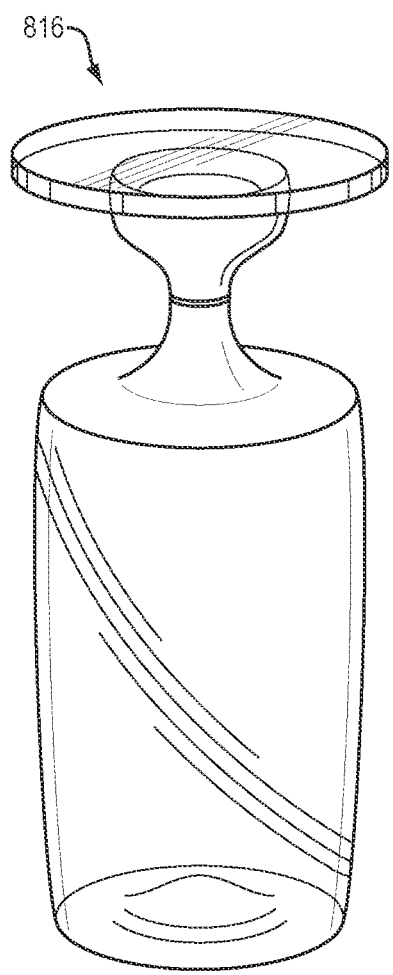
Figure 8H:
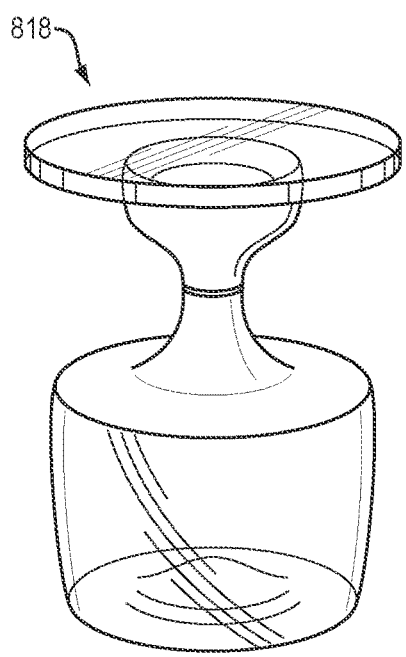

FIG. 8A shows an alternative design for a load-bearing storage container 800 which includes a support 802 mounted on a hollow base 804. As shown in FIGS. 8B, 8D and 8E, storage container 800 is adaptable to serve as a load-bearing and storage structure for a variety of chairs 806, 808 and 810. Similarly, as shown in FIGS. 8C, 8F, 8G and 8H, storage container 800 is adaptable to serve as a load-bearing and storage structure for a variety of tables 812, 814, 816 and 818.

Figure 9A:
FIG. 9A is a perspective view of a load-bearing storage container for storing water or other material which may be adapted for use with a variety of furniture types.
Figure 9D:
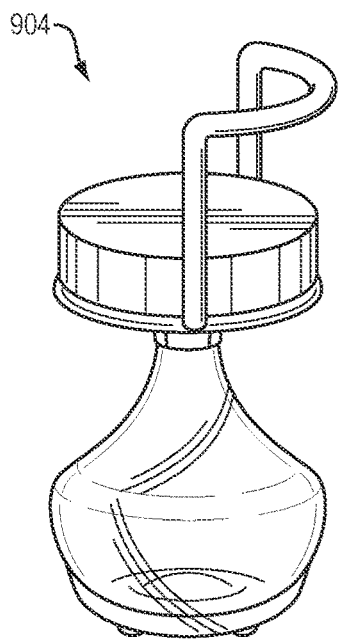
FIGS. 9B-9H are perspective views of a variety of chairs and tables that incorporate the storage container shown in FIG. 9A.
Figure 9B:
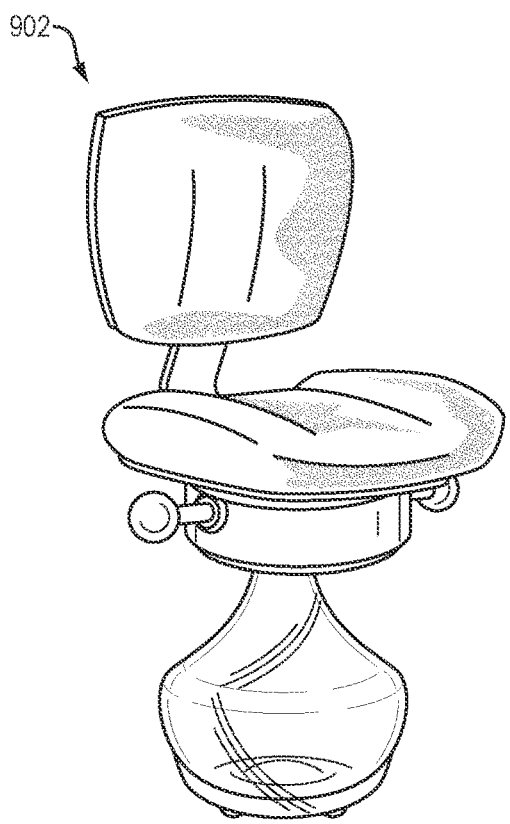
Figure 9E:
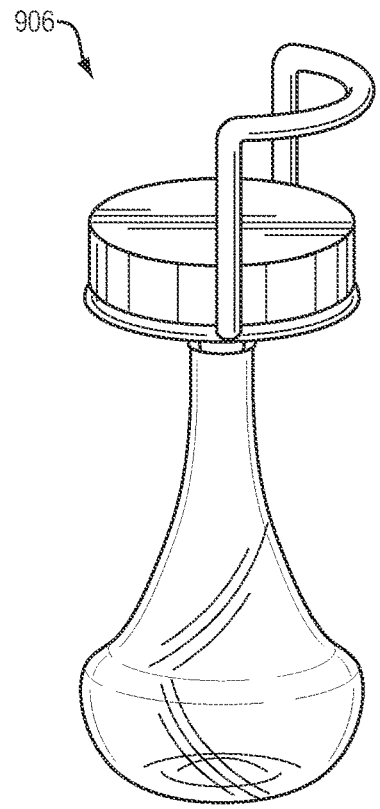
Figure 9C:
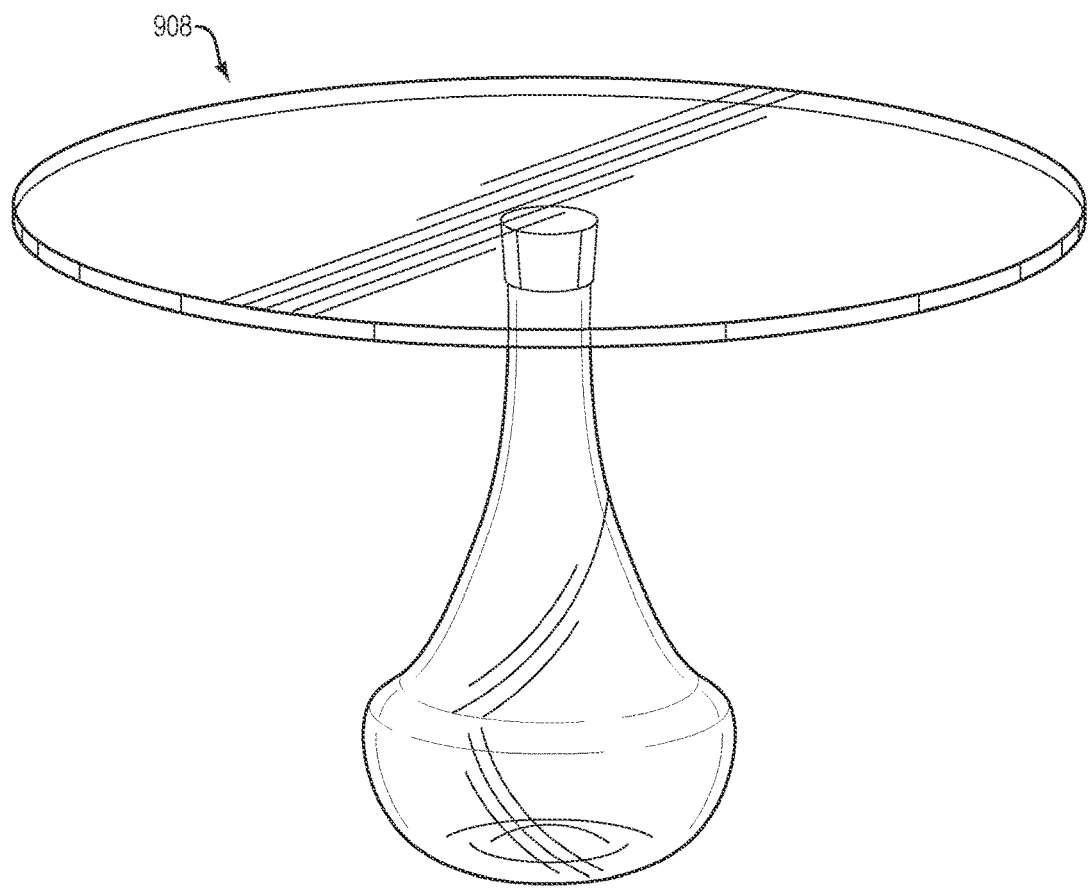
Figure 9F:
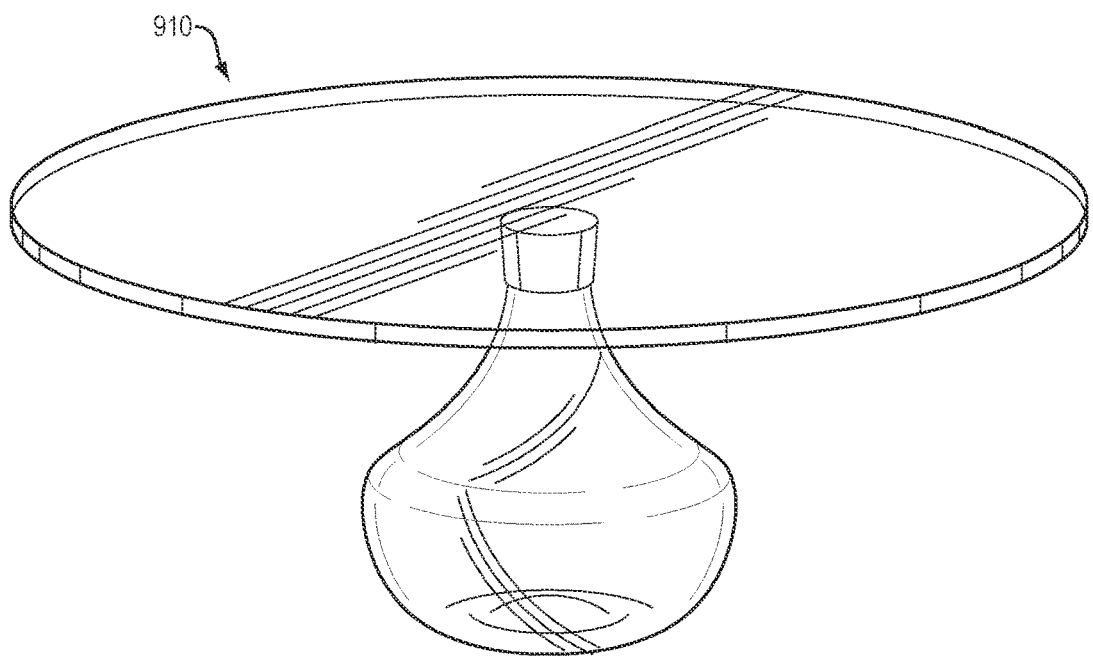
Figure 9G:
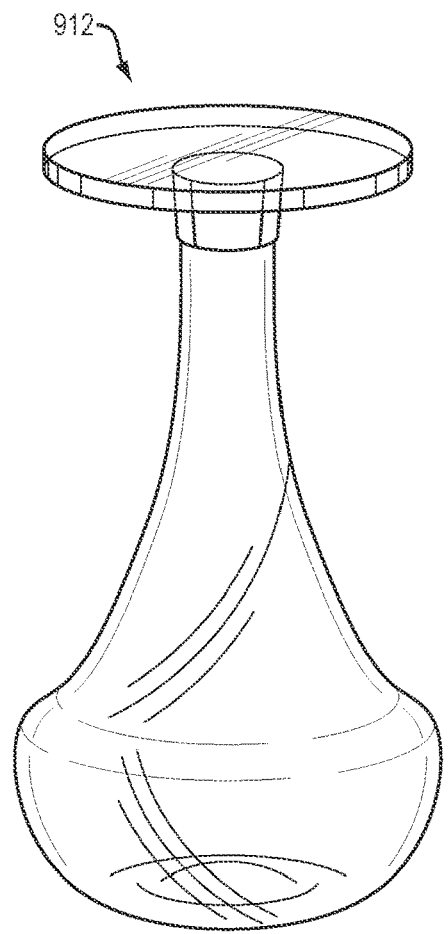
Figure 9H:
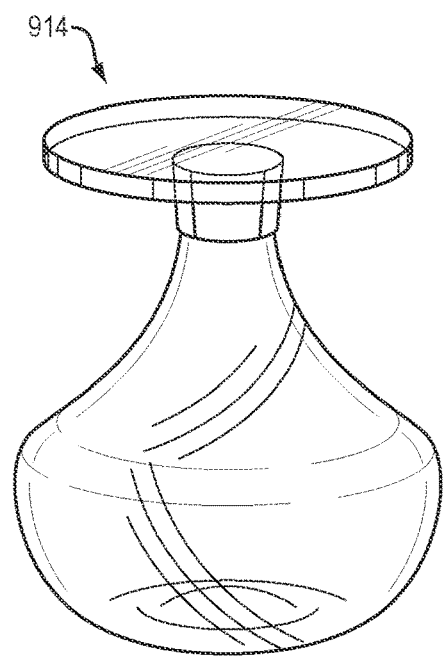

FIG. 9A shows yet another alternative design for a load-bearing water container 900. As shown in FIGS. 9B, 9D and 9E, storage container 900 is adaptable to serve as a load-bearing and storage structure for a variety of chairs 902, 904 and 906. Similarly, as shown in FIGS. 9C, 9F, 9G and 9H, storage container 900 is adaptable to serve as a load-bearing and storage structure for a variety of tables 908, 910, 912 and 914.

Figure 10:
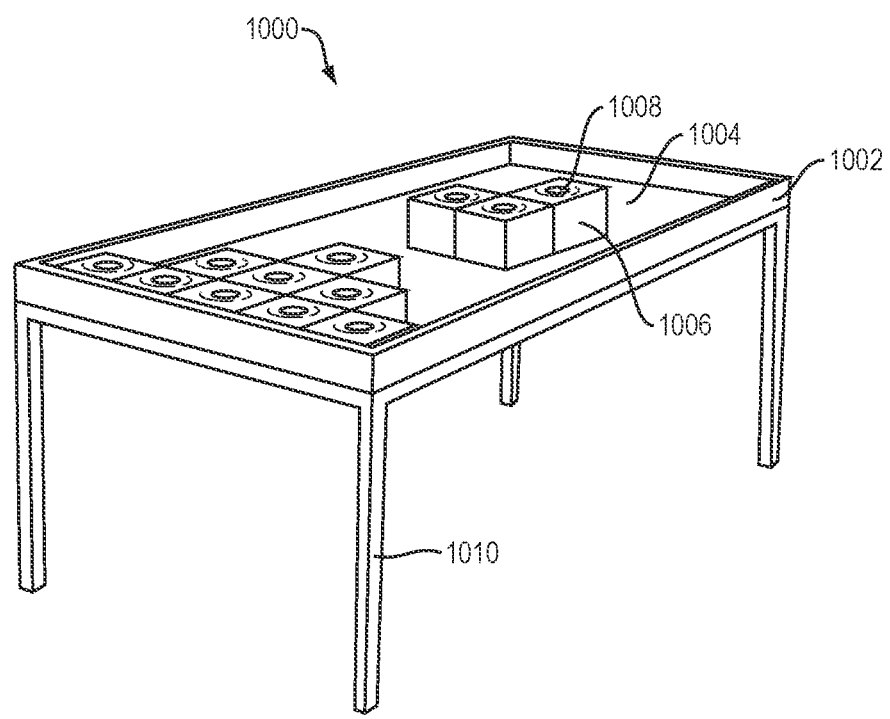
FIG. 10 is a perspective view of a rectangular table having a top which includes a recessed area for housing one or more storage containers that may be used to store water or other material.

FIG. 10 shows a table 1000 which includes four legs 1010 and a load-bearing frame 1002 that defines a recessed area 1004. Although omitted for greater clarity, it should be understood that a tabletop would typically overlay the entirety of recessed area 1004 and typically, but not necessarily, extend peripherally beyond the edges of frame 1002. Recessed area 1004 accommodates a group of storage containers 1006 each of which includes a spout or inlet 1008. Storage containers 1006 may be accessed by removing the tabletop. In alternative embodiments, legs 1010 may be replaced by a conventional pedestal structure, one of the housings or cabinet-type pedestals disclosed herein, or other suitable load-bearing structures.

Figure 11:
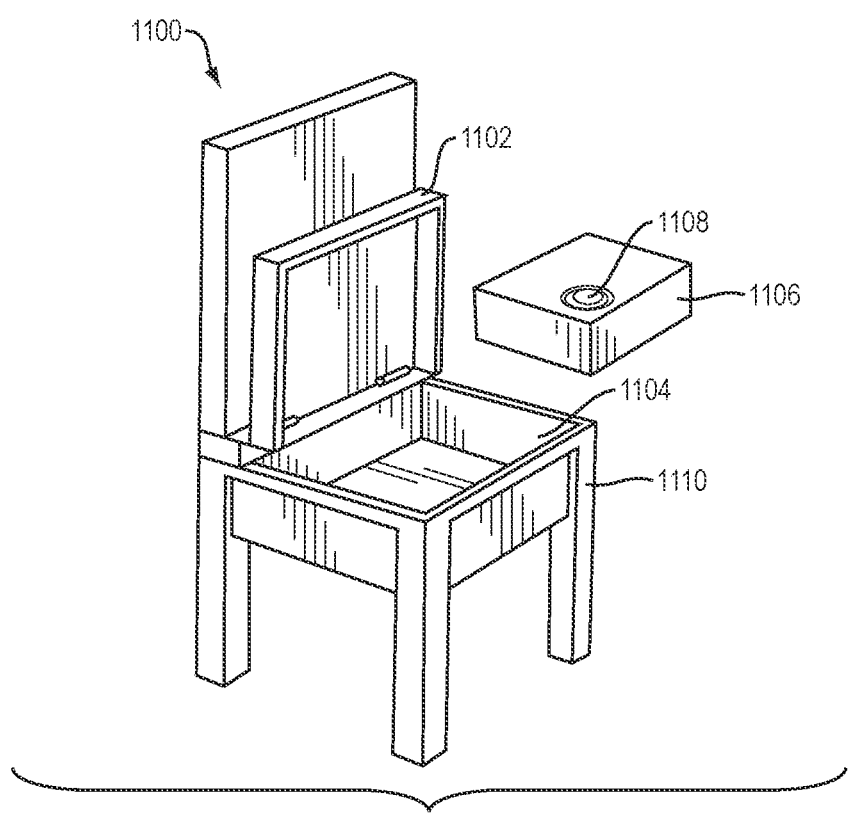
FIG. 11 is a perspective view of a chair whose seat includes a recessed area for housing one or more storage containers that may be used to store water or other material.

FIG. 11 shows a chair 1100 having a load-bearing frame 1110 and a hinged or removable seat 1102 which may be lifted to gain access to a recessed area 1104. One or more storage containers 1106, each of which includes a spout or inlet 1108, is shaped and dimensioned to fit within recessed area 1104.

Figure 12B:
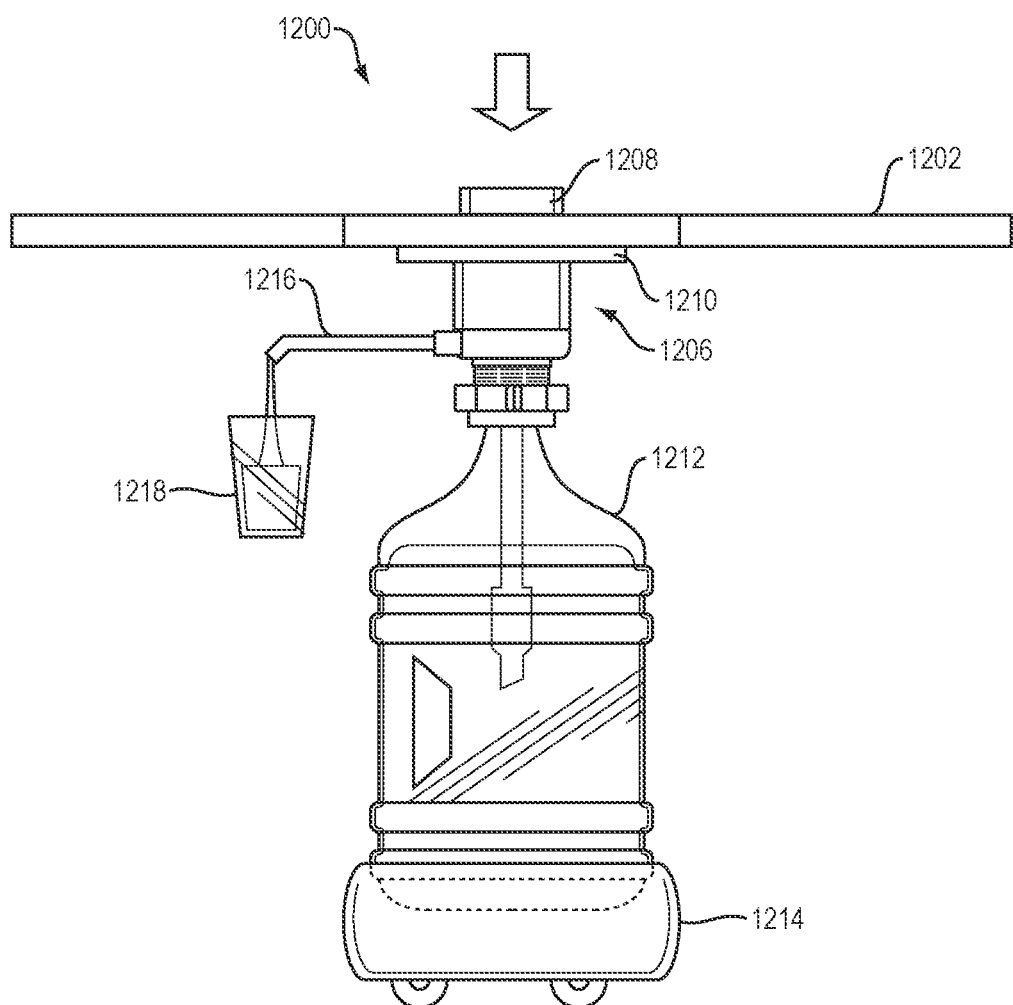
FIG. 12B is a side elevation of the table shown in FIG. 12A fully assembled.

FIG. 12A shows a partially exploded view of a table 1200 which includes a tabletop 1202, a pump assembly 1206, a load-bearing storage container 1212 and an optional wheeled base 1214. Tabletop 1202 includes a central aperture 1204 which is located and sized to accommodate an actuator 1208. Tabletop 1202 normally rests on an annular support 1210, thereby preferably enabling actuator 1208 to stand flush with or proud of the top surface of tabletop 1202 as shown in FIG. 12B. By exerting downward pressure on actuator 1208, a user may draw water or other liquid from storage container 1212 through spigot 1216 and into glass 1218. Thus, in the embodiment shown in FIGS. 12A and 12B, water or other liquid stored in storage container 1212 is generally accessible for use at any time and need not be considered merely an emergency supply.

Figure 13A:
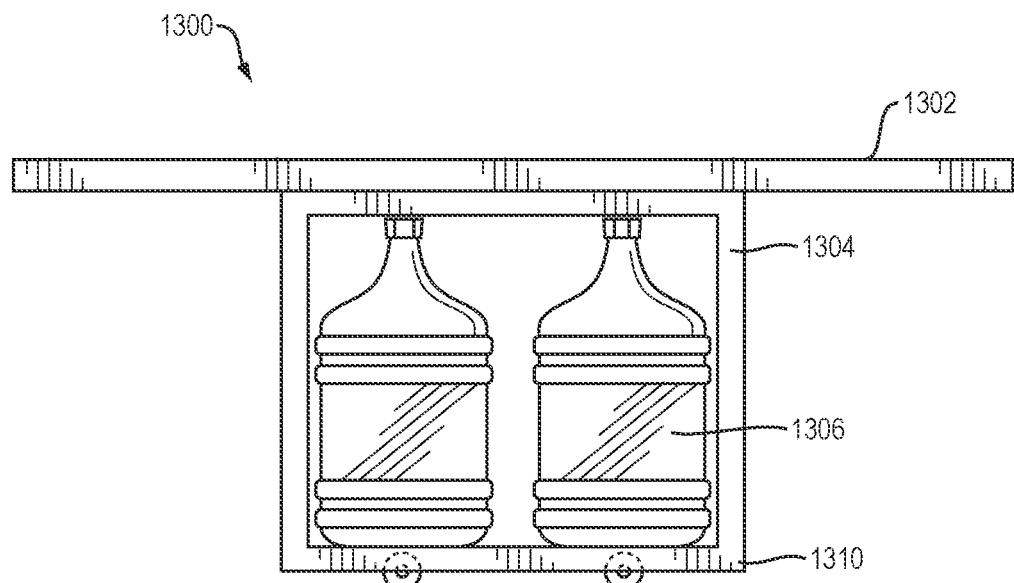
FIG. 13A is an elevation view of a table having a cabinet base in which storage containers are housed.
Figure 13B:
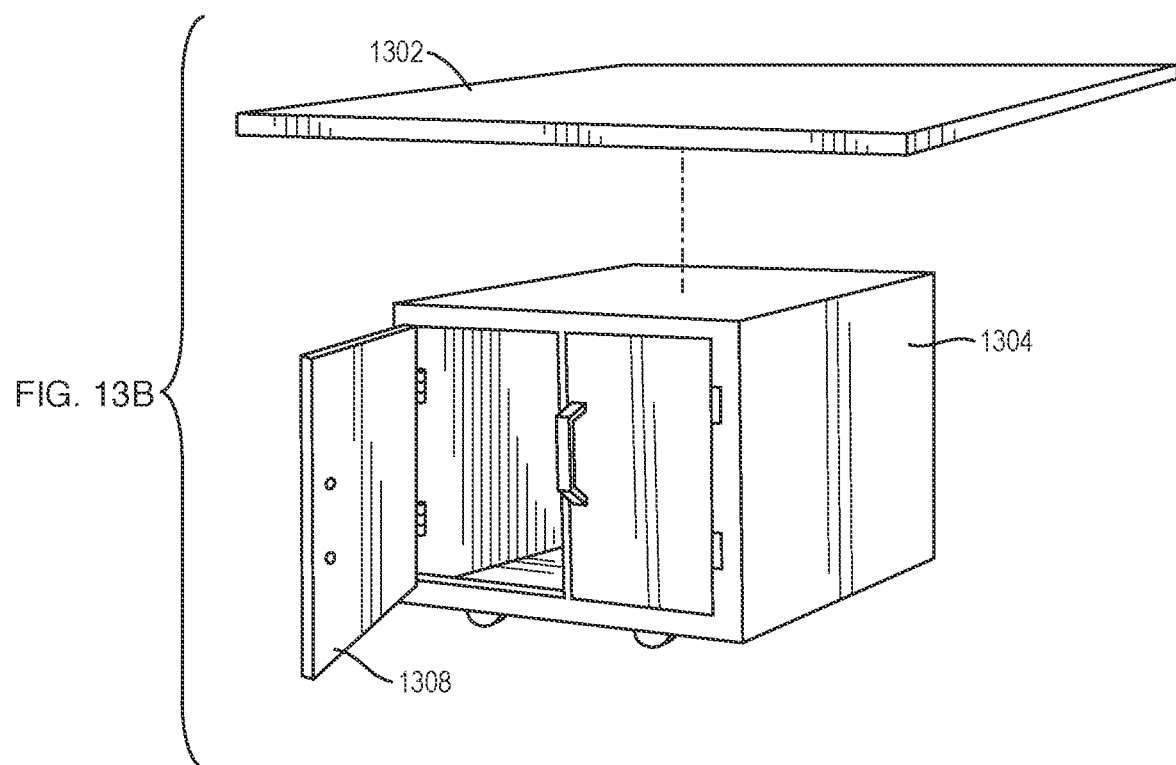
FIG. 13B is a perspective view of a table having a cabinet base with doors.

FIGS. 13A-13B show a table 1300 having a rectangular top 1302 and a cabinet base 1304 which houses storage containers 1306. Cabinet 1304 may include doors 1308 to conceal storage containers 1306 or may omit such doors. Cabinet 1304 may also include an optional wheeled base 1310.

Figure 14A:
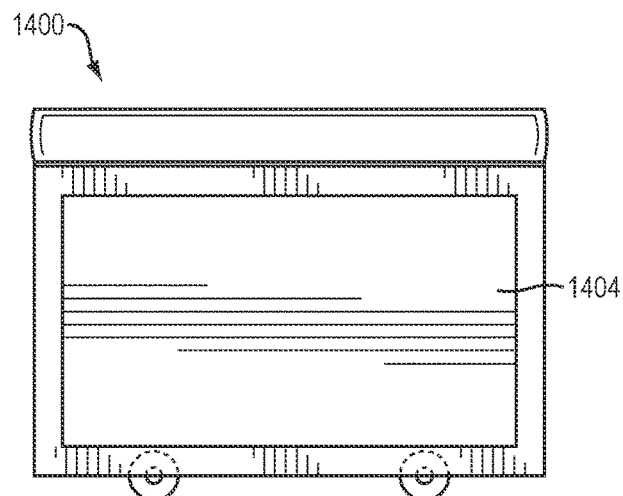
FIGS. 14A-14C show an ottoman having an interior compartment in which a storage container is housed.
Figure 14B:
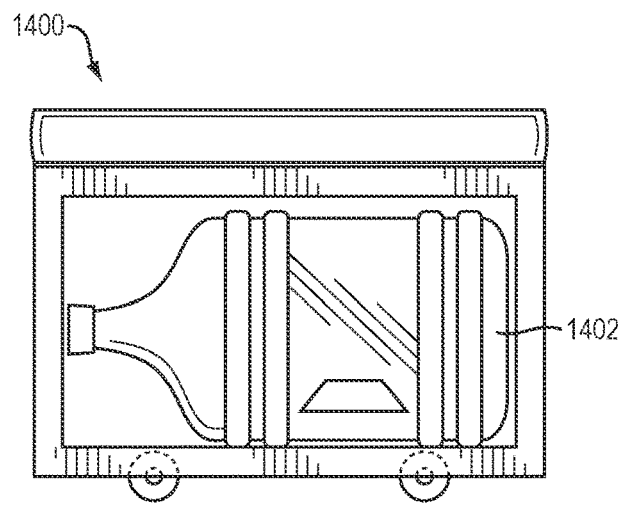
Figure 14C:
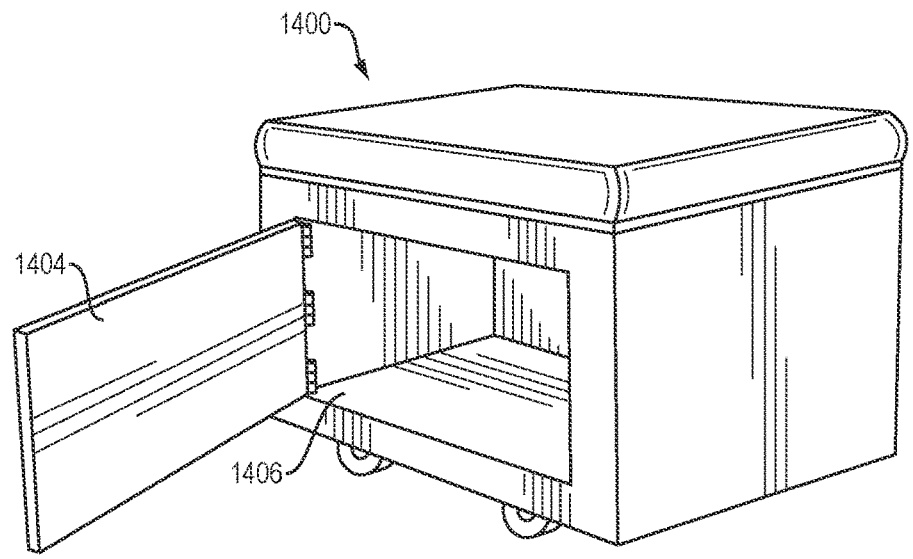

FIGS. 14A-14C show an ottoman 1400 which includes a compartment 1406 for a storage container 1402. Access to compartment 1406 and storage container 1402 may be gained through a door 1404.

Figure 15:
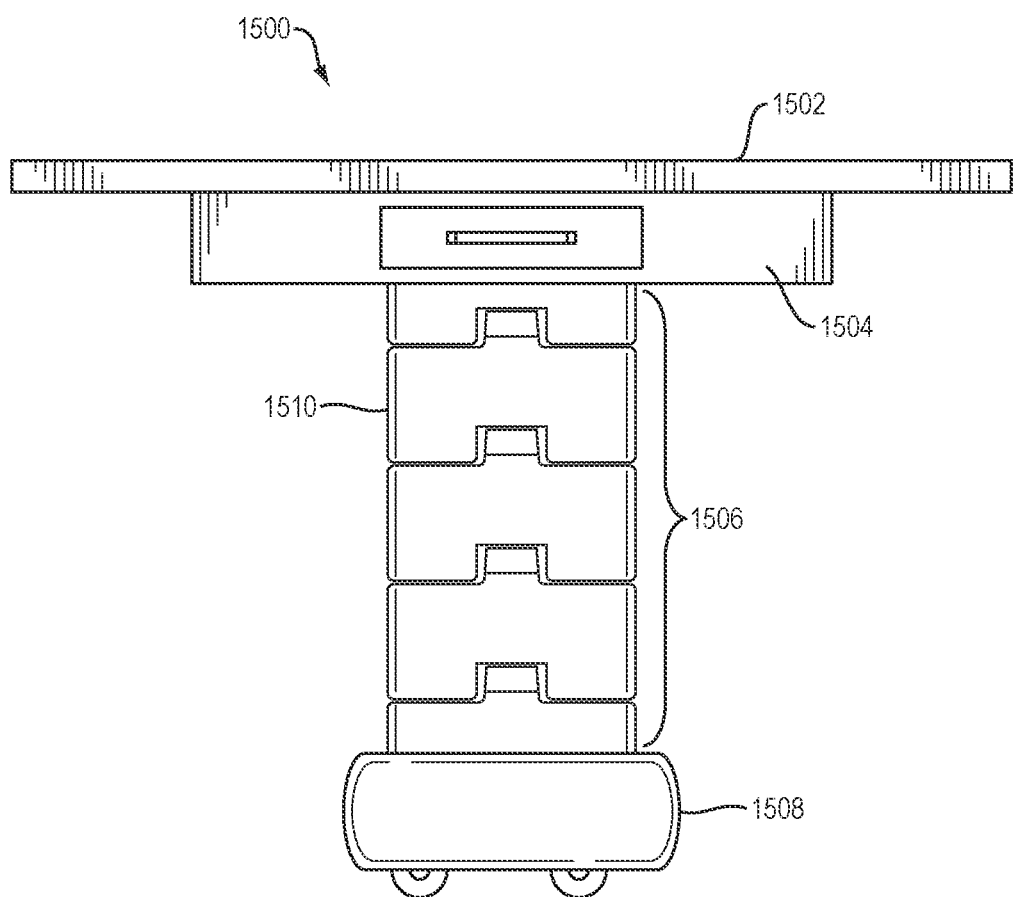
FIG. 15 is an elevation view of a table having a pedestal support made of stackable, load-bearing storage containers.

FIG. 15 shows a table 1500 in which a table top 1502 rests on a drawer box 1504. A load bearing pedestal 1506 which supports table top 1502 and drawer box 1504 is formed from several stackable, load-bearing storage containers 1510. Pedestal 1506 is supported by an optional wheeled base 1508.

Figure 16A:
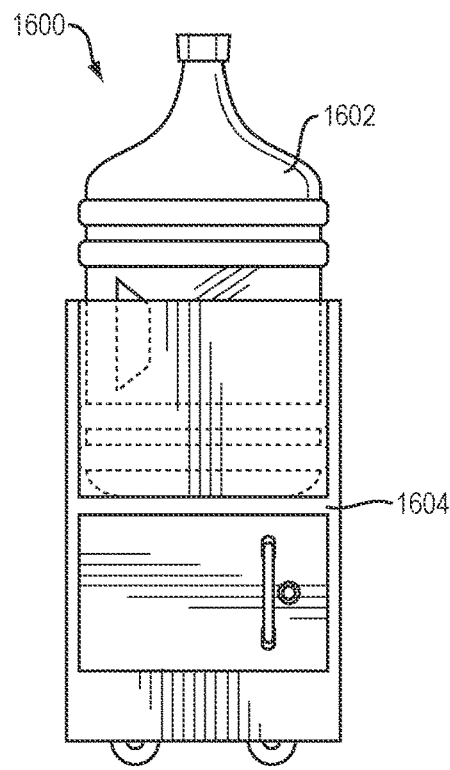
FIGS. 16A-16B are elevation views of cabinets which either support or are supported by storage containers.
Figure 16B:
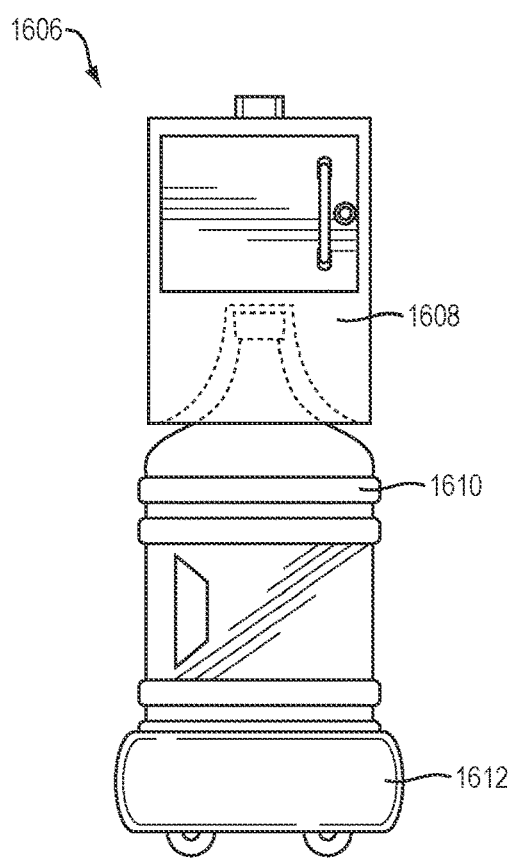

FIG. 16A shows an assembly 1600 in which a non-load bearing storage container 1602 is supported by a cabinet 1604. In an alternative embodiment shown in FIG. 16B, an assembly 1606 includes a load-bearing storage container 1610 which supports a cabinet 1608. Load-bearing storage container 1610 rests in an optional wheeled base 1612.

The chairs, tables and other furniture pieces described above may be constructed from a variety of conventional materials including wood, wood composites and laminates, plastic, metal, fabric, glass or various combinations of those materials or others. The storage containers described above may, where appropriate, be implemented with essentially conventional plastic, reusable water containers or may be implemented with other containers whose dimensions, shapes and materials are chosen to meet the requirements of a particular application. Such other water containers described above, which require particular dimensions or shapes to fit within particular spaces, may be constructed from plastic or other conventional materials. The storage containers described above may also be adapted to include a mechanism for automatically releasing a purifying chemical or a mechanism to provide a visual reminder to a user to replenish a purifying chemical or take other action.

As an alternative to the optional wheeled bases (e.g., wheeled base 106 in FIG. 1A) described above, a non-wheeled base may be used and may include a bottom surface covered with felt or similar material that would allow sliding over hard floor surfaces.

As an alternative to storing water, the storage containers described above may be used to store other liquids, powders, grains or other objects.

What is claimed is:

1. A loveseat having integrated water stores, said loveseat comprising:
    first and second armchairs, each of said first and second armchairs having a seat, a back, an armrest, a compartment disposed beneath said seat, and one or more water storage containers housed in said compartment; and
    said first and second armchairs secured together by one or more clips each of which is shaped and dimensioned to engage with a corresponding pair of slots, one of each said pair of slots located on one of said first and second armchairs.

* * * * *